US008111299B2

(12) United States Patent
Lukac

(10) Patent No.: US 8,111,299 B2
(45) Date of Patent: Feb. 7, 2012

(54) DEMOSAICKING SINGLE-SENSOR CAMERA RAW DATA

(75) Inventor: Rastislav Lukac, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 796 days.

(21) Appl. No.: 12/192,714

(22) Filed: Aug. 15, 2008

(65) Prior Publication Data

US 2010/0039563 A1 Feb. 18, 2010

(51) Int. Cl.
*H04N 5/235* (2006.01)
*G06K 9/00* (2006.01)
(52) U.S. Cl. .................................. 348/222.1; 382/162
(58) Field of Classification Search ............... 348/222.1, 348/272, 273, 277–280; 382/162, 254, 266, 382/269
See application file for complete search history.

(56) References Cited

U.S. PATENT DOCUMENTS

| 5,428,398 | A | * | 6/1995 | Faroudja | 348/452 |
| 5,541,668 | A | * | 7/1996 | Kuwahara et al. | 348/624 |
| 6,507,364 | B1 | | 1/2003 | Bishay et al. | |
| 6,628,330 | B1 | * | 9/2003 | Lin | 348/252 |
| 6,781,626 | B1 | | 8/2004 | Wang | |
| 6,791,609 | B2 | | 9/2004 | Yamauchi et al. | |
| 6,904,166 | B2 | | 6/2005 | Hsia et al. | |
| 6,933,970 | B2 | * | 8/2005 | Koshiba et al. | 348/273 |
| 7,088,392 | B2 | | 8/2006 | Kakarala et al. | |
| 7,362,894 | B2 | * | 4/2008 | Ono et al. | 382/167 |
| 7,773,138 | B2 | * | 8/2010 | Lahav et al. | 348/280 |
| 7,924,462 | B2 | * | 4/2011 | Nishio | 358/2.1 |
| 2004/0109068 | A1 | * | 6/2004 | Mitsunaga et al. | 348/222.1 |
| 2004/0169747 | A1 | * | 9/2004 | Ono et al. | 348/272 |
| 2005/0146629 | A1 | | 7/2005 | Muresan | |

(Continued)

FOREIGN PATENT DOCUMENTS

EP 1289310 A2 3/2003

OTHER PUBLICATIONS

Color Demosaicing Using Variance of Color Differences, King-Hong Chung and Yuk-Hee Chan, Centre for Multimedia Signal Processing, Department of Electronic and Information Engineering, The Hong Kong Polytechnic University, Hong Kong, Oct. 2006, (pp. 1-23).

*Primary Examiner* — Sinh Tran
*Assistant Examiner* — Selam Gebriel
(74) *Attorney, Agent, or Firm* — Mark P. Watson

(57) ABSTRACT

An image processing method that demosaicks a mosaic input image of R, G, and B components to generate a full color output image. The image processing method calculates both vertical and horizontal luminance-chrominance difference components for each pixel of the mosaic input image. Next, the image processing method calculates an enhanced version of both the vertical and horizontal luminance-chrominance difference components for each pixel of the mosaic input image. Next, the image processing method evaluates the variations in the enhanced luminance-chrominance difference components in order to create an edge directional map indicating the direction in which demosaicking should be performed. Then, the image processing method interpolates a G component for each of the pixels with the original R and B components using the edge directional map. Next, the image processing method interpolates an R component for each of the pixels with the original G and B components and a B component for each of the pixels with the original R and G components. Finally, the image processing method enhances the interpolated R and B components using the edge directional map.

26 Claims, 14 Drawing Sheets

U.S. PATENT DOCUMENTS

| | | |
|---|---|---|
| 2006/0038891 A1* | 2/2006 | Okutomi et al. ............ 348/222.1 |
| 2006/0153473 A1* | 7/2006 | Ruggiero ...................... 382/276 |
| 2006/0170798 A1 | 8/2006 | Lee et al. |
| 2006/0250655 A1 | 11/2006 | Wu |
| 2006/0285007 A1* | 12/2006 | Yuyama et al. ............... 348/362 |
| 2007/0002154 A1 | 1/2007 | Kang et al. |
| 2007/0013794 A1* | 1/2007 | Tsuruoka ...................... 348/241 |
| 2007/0110300 A1 | 5/2007 | Chang et al. |
| 2007/0292022 A1* | 12/2007 | Nilsson et al. ................ 382/167 |
| 2008/0043115 A1* | 2/2008 | Tsukioka ................... 348/222.1 |
| 2008/0074538 A1* | 3/2008 | Chang .......................... 348/448 |
| 2008/0095466 A1* | 4/2008 | Kinrot et al. .................. 382/284 |
| 2008/0240559 A1* | 10/2008 | Malvar ......................... 382/167 |
| 2009/0175560 A1* | 7/2009 | Lukac .......................... 382/298 |
| 2009/0244333 A1* | 10/2009 | Lukac .......................... 348/280 |
| 2010/0002954 A1* | 1/2010 | Lukac .......................... 382/274 |
| 2010/0002957 A1* | 1/2010 | Lukac .......................... 382/293 |
| 2010/0053351 A1* | 3/2010 | Lukac ....................... 348/222.1 |
| 2010/0061625 A1* | 3/2010 | Lukac .......................... 382/162 |
| 2011/0032392 A1* | 2/2011 | Litvinov et al. ............... 348/241 |

* cited by examiner

Color Difference Component In Vertical Direction $$\Delta^V_{(r,s)} = \boxed{Z_{(r,s)}}_{\text{G Component}} - \boxed{(Z_{(r-1,s)} + Z_{(r+1,s)})/2}_{\text{R Component or B Component}} \quad \text{G-Component Pixel}$$

$$\Delta^V_{(r,s)} = \boxed{(Z_{(r-1,s)} + Z_{(r+1,s)})/2}_{\text{G Component}} - \boxed{Z_{(r,s)}}_{\text{R Component or B Component}} \quad \text{Non-G-Component Pixel}$$

FIG. 5A

Color Difference Component In Horizontal Direction $$\Delta^h_{(r,s)} = \boxed{Z_{(r,s)}}_{\text{G Component}} - \boxed{(Z_{(r,s-1)} + Z_{(r,s+1)})/2}_{\text{R Component or B Component}} \quad \text{G-Component Pixel}$$

$$\Delta^h_{(r,s)} = \boxed{(Z_{(r,s-1)} + Z_{(r,s+1)})/2}_{\text{G Component}} - \boxed{Z_{(r,s)}}_{\text{R Component or B Component}} \quad \text{Non-G-Component Pixel}$$

FIG. 5B

$$\begin{cases} \hat{\Delta}^v_{(r,s)} = (\Delta^v_{(r-2,s)} + 2\Delta^v_{(r-1,s)} + 4\Delta^v_{(r,s)} + 2\Delta^v_{(r+1,s)} + \Delta^v_{(r+2,s)})/10 \\ \hat{\Delta}^h_{(r,s)} = (\Delta^h_{(r,s-2)} + 2\Delta^h_{(r,s-1)} + 4\Delta^h_{(r,s)} + 2\Delta^h_{(r,s+1)} + \Delta^h_{(r,s+2)})/10 \end{cases}$$
*FIG. 6A*
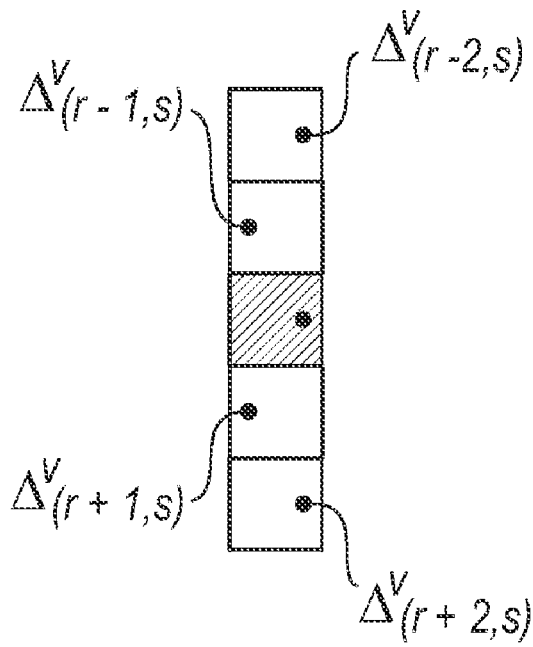
*FIG. 6B*
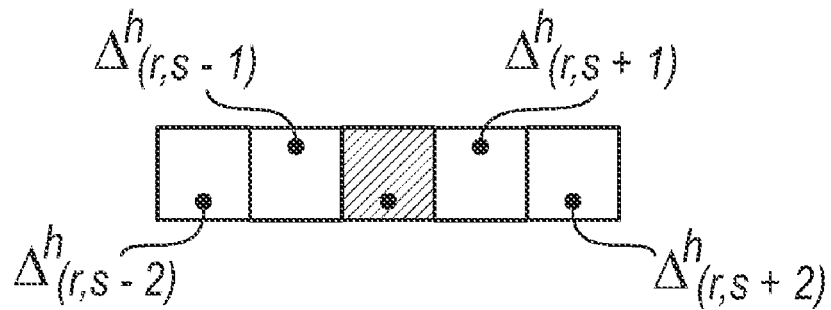
*FIG. 6C*

$$\upsilon^v_{(r,s)} = \sum_{i=-1}^{1} \left( (\hat{\Delta}^v_{(r-2,s+i)} - \hat{\Delta}^v_{(r,s+i)})^2 + (\hat{\Delta}^v_{(r,s+i)} - \hat{\Delta}^v_{(r+2,s+i)})^2 + (\hat{\Delta}^v_{(r-2,s+i)} - \hat{\Delta}^v_{(r+2,s+i)})^2 \right)$$

*FIG. 8A*

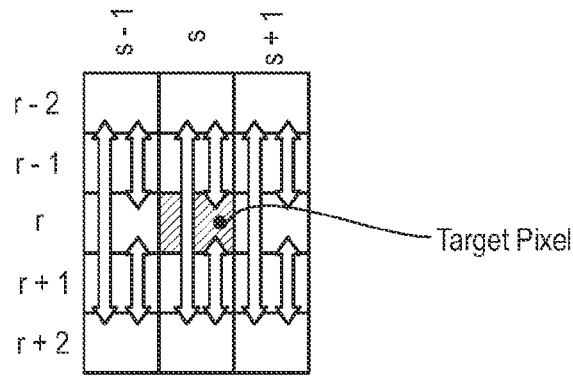

*FIG. 8B*

$$\upsilon^h_{(r,s)} = \sum_{i=-1}^{1} \left( (\hat{\Delta}^h_{(r+i,s-2)} - \hat{\Delta}^h_{(r+i,s)})^2 + (\hat{\Delta}^h_{(r+i,s)} - \hat{\Delta}^h_{(r+i,s+2)})^2 + (\hat{\Delta}^h_{(r+i,s-2)} - \hat{\Delta}^h_{(r+i,s+2)})^2 \right)$$

*FIG. 9A*

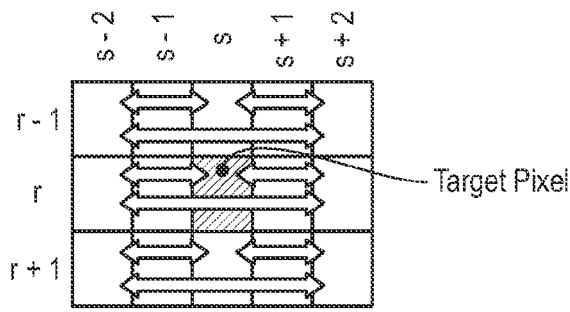

*FIG. 9B*

$$d_{(r,s)} = \begin{cases} 1 & \text{for } \upsilon^v_{(r,s)} < \upsilon^h_{(r,s)} \\ 3 & \text{for } \upsilon^v_{(r,s)} > \upsilon^h_{(r,s)} \\ 2 & \text{otherwise} \end{cases} \qquad d_{(r,s)} = \begin{cases} 1 & \text{for } \upsilon^v_{(r,s)} < \upsilon^h_{(r,s)} \text{ and } \upsilon^v_{(r,s)} > \Phi \\ 3 & \text{for } \upsilon^v_{(r,s)} > \upsilon^h_{(r,s)} \text{ and } \upsilon^h_{(r,s)} > \Phi \\ 2 & \text{otherwise} \end{cases}$$

$$x_{(r,s)2} = \begin{cases} z_{(r,s)} + (\hat{\Delta}^v_{(r-1,s)} + \hat{\Delta}^v_{(r+1,s)})/2 & \text{for } d_{(r,s)} = 1 \\ z_{(r,s)} + (\hat{\Delta}^h_{(r,s-1)} + \hat{\Delta}^h_{(r,s+1)})/2 & \text{for } d_{(r,s)} = 3 \\ z_{(r,s)} + (\hat{\Delta}^v_{(r-1,s)} + \hat{\Delta}^v_{(r+1,s)} + \hat{\Delta}^h_{(r,s-1)} + \hat{\Delta}^h_{(r,s+1)})/4 & \text{otherwise} \end{cases}$$

*FIG. 12A*

$$x_{(r,s)2} = \begin{cases} z_{(r,s)} + (\hat{\Delta}^v_{(r-1,s)} + \hat{\Delta}^v_{(r+1,s)})/2 & \text{for } d_{(r,s)} = 1 \\ z_{(r,s)} + (\hat{\Delta}^h_{(r,s-1)} + \hat{\Delta}^h_{(r,s+1)})/2 & \text{for } d_{(r,s)} = 3 \\ z_{(r,s)} + \dfrac{\upsilon^h_{(r,s)}(\hat{\Delta}^v_{(r-1,s)} + \hat{\Delta}^v_{(r-1,s)})/2 + \upsilon^v_{(r,s)}(\hat{\Delta}^h_{(r,s-1)} + \hat{\Delta}^h_{(r,s+1)})/2}{\upsilon^h_{(r,s)} + \upsilon^v_{(r,s)}} & \text{otherwise} \end{cases}$$

$$x_{(r,s)1} = \begin{cases} x_{(r,s)2} + (x_{(r-1,s)1} - x_{(r-1,s)2} + x_{(r+1,s)1} - x_{(r+1,s)2})/2 & \text{if } D < 2 \\ x_{(r,s)2} + (x_{(r,s-1)1} - x_{(r,s-1)2} + x_{(r,s+1)1} - x_{(r,s+1)2})/2 & \text{if } D > 2 \\ x_{(r,s)1} & \text{otherwise} \end{cases}$$

FIG. 16B

$$x_{(r,s)3} = \begin{cases} x_{(r,s)2} + (x_{(r-1,s)3} - x_{(r-1,s)2} + x_{(r+1,s)3} - x_{(r+1,s)2})/2 & \text{if } D < 2 \\ x_{(r,s)2} + (x_{(r,s-1)3} - x_{(r,s-1)2} + x_{(r,s+1)3} - x_{(r,s+1)2})/2 & \text{if } D > 2 \\ x_{(r,s)3} & \text{otherwise} \end{cases}$$

FIG. 16C

DEMOSAICKING SINGLE-SENSOR CAMERA RAW DATA

BACKGROUND

1. Technical Field

Embodiments of the present invention relate to techniques of generating image data with an imaging device, such as a digital camera. More specifically, embodiments of the invention pertain to techniques of demosaicking a mosaic arrangement of fine color filters of R (red), G (green), and B (blue) corresponding to three primary colors of light.

2. Related Art

With the advancement of digital techniques, images are increasingly processed as digital data (image data). Imaging devices such as digital cameras enable immediate output of captured images in the form of image data. Imaging devices are typically equipped with an electronic image sensor consisting of small elements for converting light intensities into electric signals. The imaging device focuses a captured image of a subject on the image sensor by means of an optical system and detects the light intensities in the individual elements as electric signals to generate image data. The light entering the optical system may be divided into three color components, R, G, and B, corresponding to three primary colors of light. The respective color lights of the three color components R, G, and B are directed to the image sensor, and the electric signals representing the light intensities of the respective color components acquired by the sensor are output to generate color image data. It is noted that G components are often referred to as 'luminance' components whereas R and B components are often referred to as 'chrominance' components.

The simplest method of acquiring the respective color lights of the three color components R, G, and B (which are obtained as divisions of the light entering the optical system) by the image sensor uses a spectroscopic prism to divide the incident light into the color lights of the three color components R, G, and B and focuses the respective color lights on image sensors to generate image data with regard to the respective color components R, G, and B. This method undesirably requires the three image sensors. Therefore, an imaging device relying on three image sensors to capture color images is sometimes called a 'three image sensor' device.

To reduce the cost of an imaging device, one common technique, known as a color filter array, allocates one of the R, G, and B color components to each of the light-sensitive elements constituting the image sensor to attain detection of the respective color components R, G, and B by a single image sensor. A typical configuration of this technique provides small color filters allowing transmission of only the R component in front of the photo-elements assigned for detection of the R component, small color filters allowing transmission of only the G component in front of the elements assigned for detection of the G component, and small color filters allowing transmission of only the B component in front of the elements assigned for detection of the B component. Since each element assigned for detection of a predetermined color component (for example, the R component) is unable to detect the other color components (for example, the G component and the B component), the resulting image data accordingly has a mosaic arrangement of pixels of the R component, pixels of the G component, and pixels of the B component. Interpolation of missing color components in each pixel with color components of adjacent pixels enables generation of color image data with the settings of all the color components R, G, and B in all the pixels. The process of interpolating the missing color components in the image data of the mosaic arrangement to generate color image data with the settings of all the color components R, G, and B is sometimes referred to as a 'demosaicking process'. An imaging device that uses only one image sensor covered by a color filter array is occasionally called a 'single image sensor' device.

Since natural color images exhibit significant spectral correlation, demosaicking processes typically use various color correlation assumptions to minimize the processing errors which usually cause color shifts and artifacts in demosaicked images. Due to its simplicity and effectiveness, a correlation model based on the assumption of uniform color differences in a localized neighborhood is a de-facto default element in most demosaicking solutions. However, the underlying modeling assumption often breaks down in chromatic image areas with high-contrast edges, which can result in color artifacts present in the demosaicked images. Color artifacts degrade the picture quality of demosaicked images.

SUMMARY

With consumers' increasing demands for higher picture quality from imaging devices, development of demosaicking techniques that produce high-quality demosaicked full-color images has been demanded. Since the number of pixels constituting each image captured by imaging devices is increasing to fulfill consumers' demands for higher picture quality, development of demosaicking techniques that enable high-speed processing has also been demanded.

In order to accomplish at least part of the demands mentioned above, a first example embodiment of the invention is directed to an image processing apparatus that receives a mosaic input image and subjects the mosaic input image subject to a series of image processing to generate a full color output image. The image processing apparatus includes a luminance-chrominance difference component computation module, a luminance-chrominance difference component enhancement module, an edge direction detection module, a luminance component interpolation module, a chrominance component interpolation module, and a chrominance component enhancement module.

The luminance-chrominance difference component computation module is configured to calculate both vertical and horizontal luminance-chrominance difference components for each pixel of the mosaic input image. The luminance-chrominance difference component enhancement module is configured to calculate enhanced versions of both vertical and horizontal luminance-chrominance difference components for each pixel of the mosaic input image. The edge direction detection module is configured to evaluate the variations in the enhanced luminance-chrominance difference components in order to create an edge directional map indicating the direction in which demosaicking should be performed. The luminance component interpolation module is configured to interpolate a G component for each of the original R and B components using the edge directional map. The chrominance component interpolation module is configured to interpolate an R component for each of the original G and B components and a B component for each of the original R and G components. The chrominance component enhancement module is configured to enhance the interpolated R and B components using the edge directional map.

In a second example embodiment of the invention is an image processing method corresponding to the image processing apparatus of the above configuration. The image processing method demosaicks a mosaic input image to generate a full color output image. The image processing method calculates both vertical and horizontal luminance-chrominance difference components for each pixel of the mosaic input image. Next, the image processing method calculates an enhanced version of both the vertical and horizontal luminance-chrominance difference components for each pixel of the mosaic input image. Next, the image processing method evaluates the variations in the enhanced luminance-chrominance difference components in order to create an edge directional map indicating the direction in which demosaicking should be performed. Then, the image processing method interpolates a G component for each of the original R and B components using the edge directional map. Next, the image processing method interpolates an R component for each of the original G and B components and a B component for each of the original R and G components. Finally, the image processing method enhances the interpolated R and B components using the edge directional map.

In a third example embodiment of the invention, one or more computer-readable media have computer-readable instructions thereon which, when executed, implement the method for image processing method discussed above in connection with the second example embodiment of the invention. When executed, the one or more computer-readable instructions attain the respective functions described above and adequately generate a full color output image.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

FIGS. 5A and 5B show calculation formulae for calculating color difference components from raw image data;

FIGS. 6A, 6B, and 6C show calculation formulae and low pass filters applied for removal of noise included in color difference components to generate enhanced color difference components;

FIGS. 8A and 8B show calculation of a variation in a vertical direction from low-pass filtered color difference components in the vertical direction;

FIGS. 9A and 9B show calculation of a variation in a horizontal direction from low-pass filtered color difference components in the horizontal direction;

FIGS. 10A and 10B show calculation formulae for calculating an edge directional map using the variations of FIGS. 8A and 9A;

FIGS. 12A and 12B show calculation formulae for interpolating luminance components;

FIGS. 14A, 14B, 14C, and 14D show calculation formulae for interpolating chrominance components;

FIGS. 16A, 16B, and 16C show calculation formulae for enhancing chrominance components.

BEST MODES OF CARRYING OUT THE INVENTION

Figure 1:
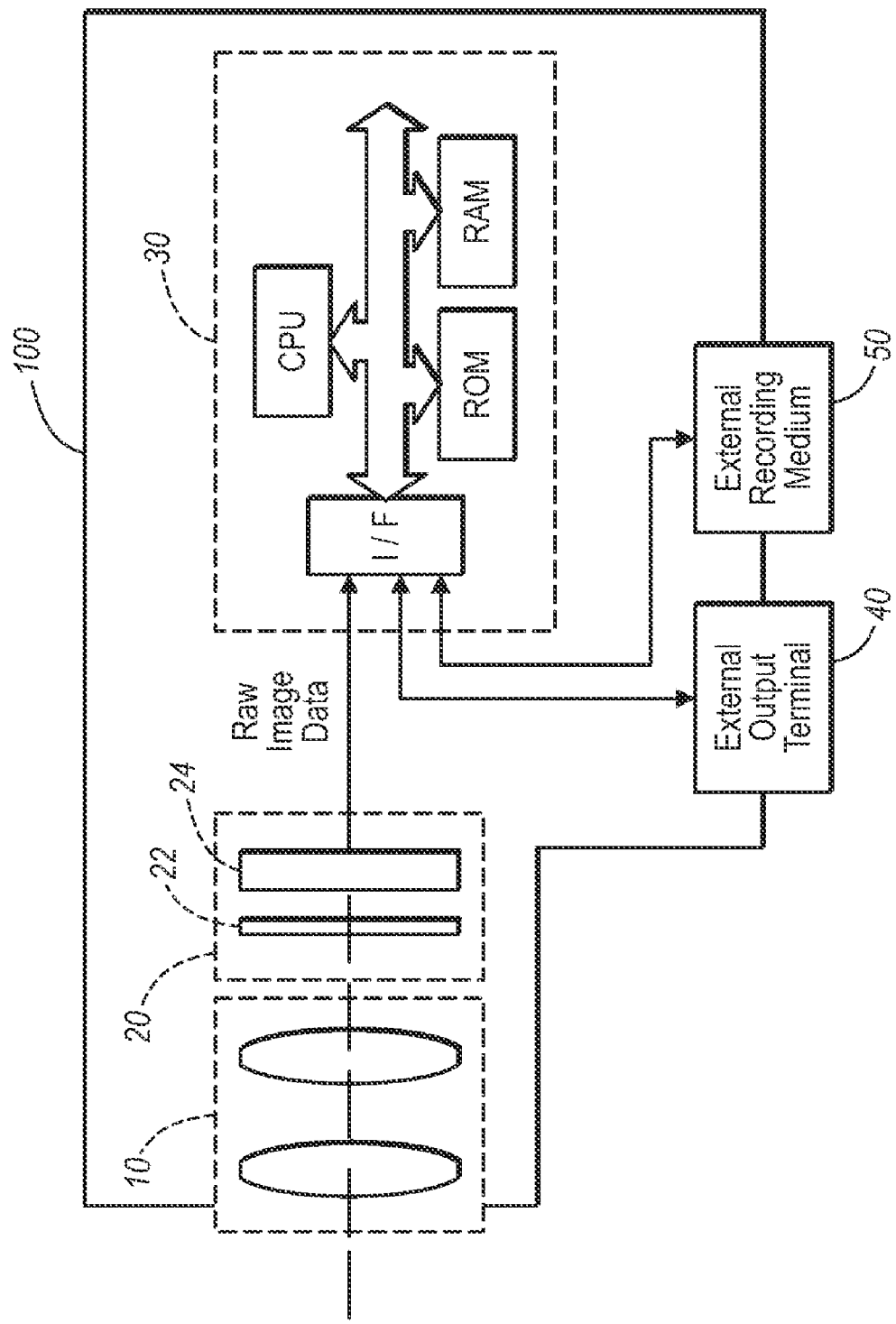
FIG. 1 schematically illustrates the configuration of a digital camera equipped with an image processing apparatus.

The invention may be understood more fully with reference to a preferred embodiment described below in the following sequence based on the accompanied drawings:
A. System Configuration
B. Outline of Color Image Data Generation Process
C. Edge Directional Map Creation Process
D. Luminance Component Interpolation Process
E. Luminance Component Clamping Process
F. Chrominance Component Interpolation Process
G. Chrominance Component Enhancement Process In the following detailed description of the embodiments, reference is made to the accompanying drawings that show, by way of illustration, specific embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. Furthermore, when it is determined that detailed description of a well-known structure or function can obscure understanding, detailed description thereof will be omitted. The following detailed description is, therefore, not to be taken in a limiting sense, and the scope of the present invention is defined only by the appended claims, along with the full scope of equivalents to which such claims are entitled.

A. System Configuration

FIG. 1 schematically illustrates the configuration of a digital camera 100 equipped with an image processing apparatus 30 in one embodiment of the invention. As illustrated, the digital camera 100 includes an optical system 10 that has a group of multiple lenses, an imaging assembly 20 that converts an image of a subject formed by the optical system 10 into electric signals, and the image processing apparatus 30 that receives the electric signals from the imaging assembly 20 and makes the received electric signals subjected to a predetermined series of image processing to generate color image data.

The imaging assembly 20 has an image sensor 24 with a two-dimensional arrangement of multiple fine imaging elements for converting the light intensities into electric signals. A color filter array 22 is provided before the image sensor 24 and has a mosaic arrangement of fine color filters of R (red), G (green), and B (blue). The arrangement of the R, G, and B color filters constituting the color filter array 22 will be described in greater detail below. The R color filters, the G color filters, and the B color filters are constructed to allow transmission of R color light, transmission of G color light, and transmission of B color light, respectively. The image sensor 24 captures image data having a mosaic arrangement of image parts responsive to the R light intensities, image parts responsive to the G light intensities, and image parts responsive to the B light intensities according to the mosaic arrangement of the R, G, and B color filters in the color filter array 22.

The image processing apparatus 30 mounted on the digital camera 100 receives the image data of the mosaic arrangement from the imaging assembly 20 and generates color image data with settings of the R component, the G component, and the B component in the respective pixels. In the image processing apparatus 30, a CPU, a ROM, a RAM, and a data input/output interface (I/F) are interconnected via a bus to enable mutual data transmission. The CPU performs a series of processing to generate the color image data according to a program stored in the ROM. The resulting color image data thus generated may be output to an external device via an external output terminal 40 or may be output to an external recording medium 50.

The image data with the mosaic arrangement of the R, G, and B components captured by the image sensor 24 is used as source data, which is referred to by the image processing apparatus 30 to generate the color image data with the settings of the R, G, and B components in the respective pixels. The image data of the mosaic arrangement captured by the image sensor 24 may thus be hereafter referred to as 'raw image data'.

Figure 2:
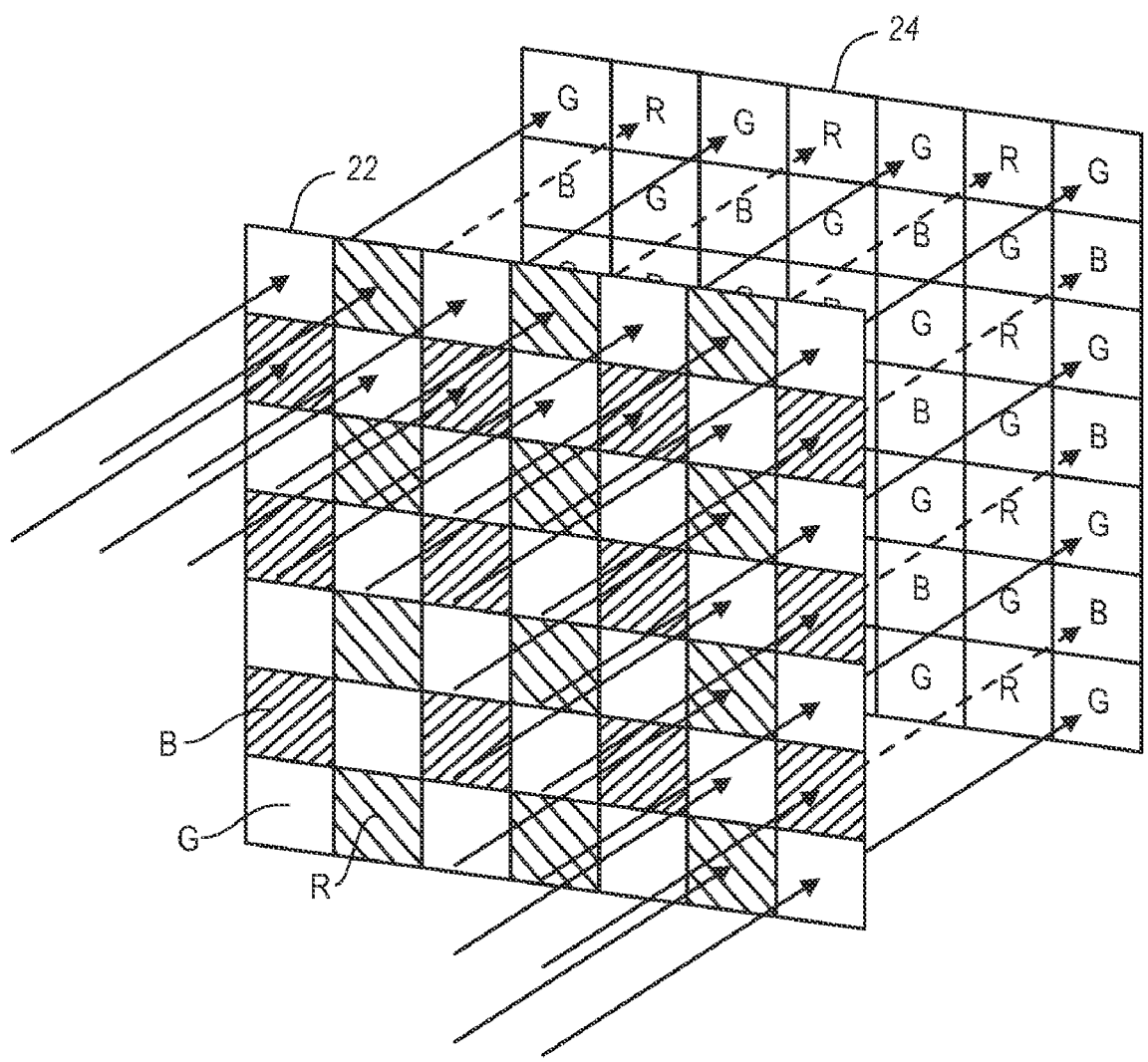
FIG. 2 is a conceptual view showing the structure of a color filter array and an image sensor included in the image processing apparatus of FIG. 1.

FIG. 2 is a conceptual view showing the structure of the color filter array 22 and the image sensor 24. As mentioned above, the image sensor 24 has the two-dimensional arrangement of fine imaging elements that output electric signals corresponding to the light intensities. In the illustrated example of FIG. 2, the fine imaging elements are arranged in a lattice pattern. Each of small rectangles in the lattice pattern of the image sensor 24 conceptually represents one imaging element.

The color filter array 22 has one of the R color filter, the G color filter, and the B color filter set corresponding to the position of each of the multiple imaging elements constituting the image sensor 24. In FIG. 2, the sparsely hatched rectangles, the densely hatched rectangles, and the non-hatched open rectangles respectively denote the R color filters, the B color filters, and the G color filters. In the arrangement of the R, G, and B color filters, the G color filters are positioned first to be diagonal to one another and form a checkerboard pattern. Namely the G color filters occupy half the area of the color filter array 22. The same numbers of the R color filters and the B color filters are then evenly arranged in the remaining half area of the color filter array 22. The resulting color filter array 22 of this arrangement shown in FIG. 2 is called the Bayer color filter array.

As mentioned above, the G color filters, the R color filters, and the B color filters are designed to allow transmission of only the G color light, transmission of only the R color light, and transmission of only the B color light, respectively. The image sensor 24 accordingly captures the image data of the mosaic arrangement by the function of the Bayer color filter array 22 located before the image sensor 24 as shown in FIG. 2. The image data of the mosaic arrangement is not processable in the same manner as ordinary image data and can not directly express an image. The image processing apparatus 30 receives the image data of the mosaic arrangement (raw image data) and generates ordinary color image data having the settings of the R, G, and B components in the respective pixels.

B. Outline of Color Image Data Generation Process

Figure 3:
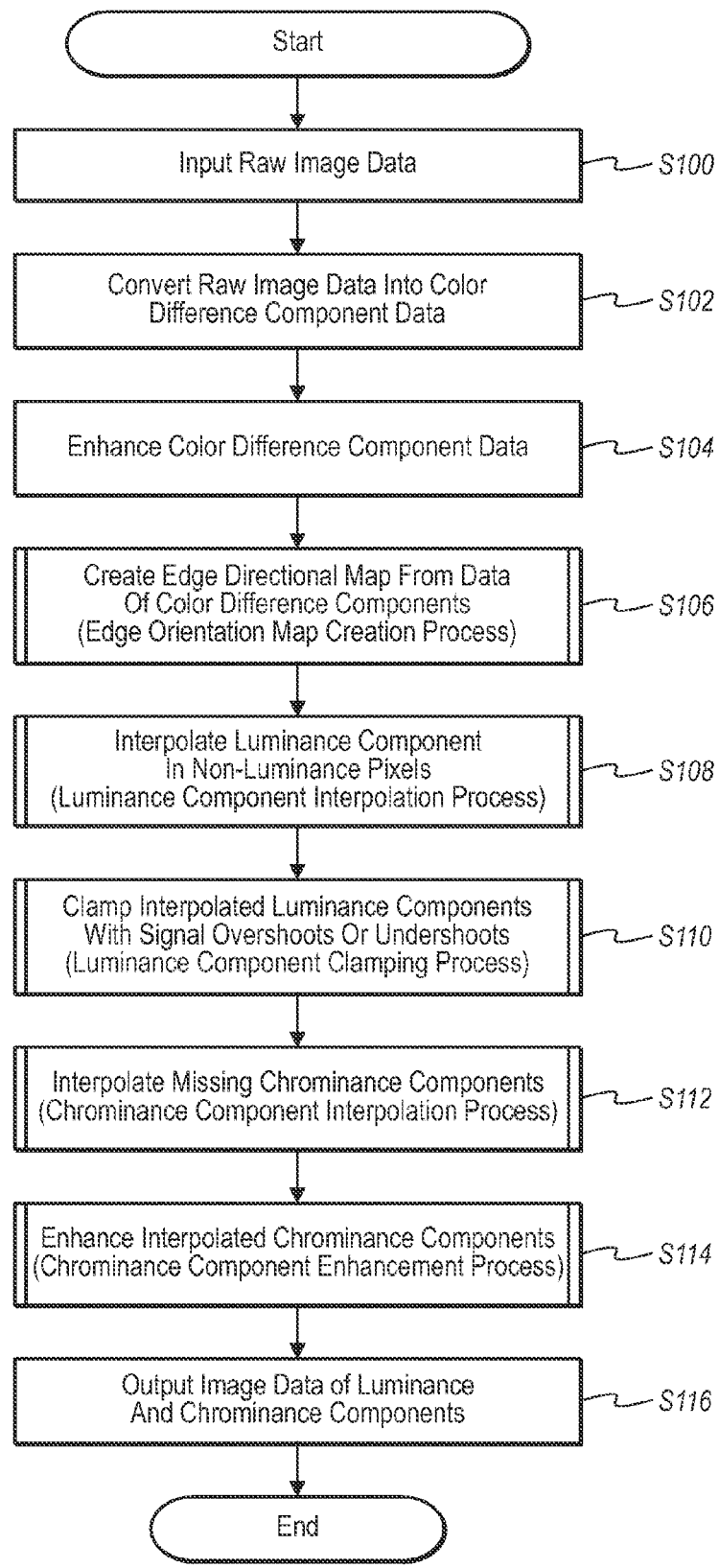
FIG. 3 is a flowchart showing a color image data generation process, which is executed by an image processing apparatus to generate color image data from raw image data.

FIG. 3 is a flowchart showing a color image data generation process, which is executed by the image processing apparatus 30 to generate color image data from the raw image data. In the structure of this embodiment, the CPU included in the image processing apparatus 30 executes this color image data generation by the software configuration. This is, however, not essential, but a specific hardware element, for example, a signal processor, may be used for the same purpose.

The color image data generation process of FIG. 3 and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological steps, it is to be understood that the subject matter defined in the appended claims is not necessarily limited to the specific steps described herein. Rather, the specific steps described herein are disclosed as example forms of implementing the claims.

On the start of the color image data generation process, the CPU first receives raw image data as source data from the image sensor 24 (step S100) and converts the received raw image data into data of color difference components (step S102) as described below in detail. It is noted that these color difference components may also be referred to herein as the 'luminance-chrominance difference components', as they are typically obtained as the difference between the G component (that is, luminance) and the R or the B component (that is, chrominance).

Figure 4:
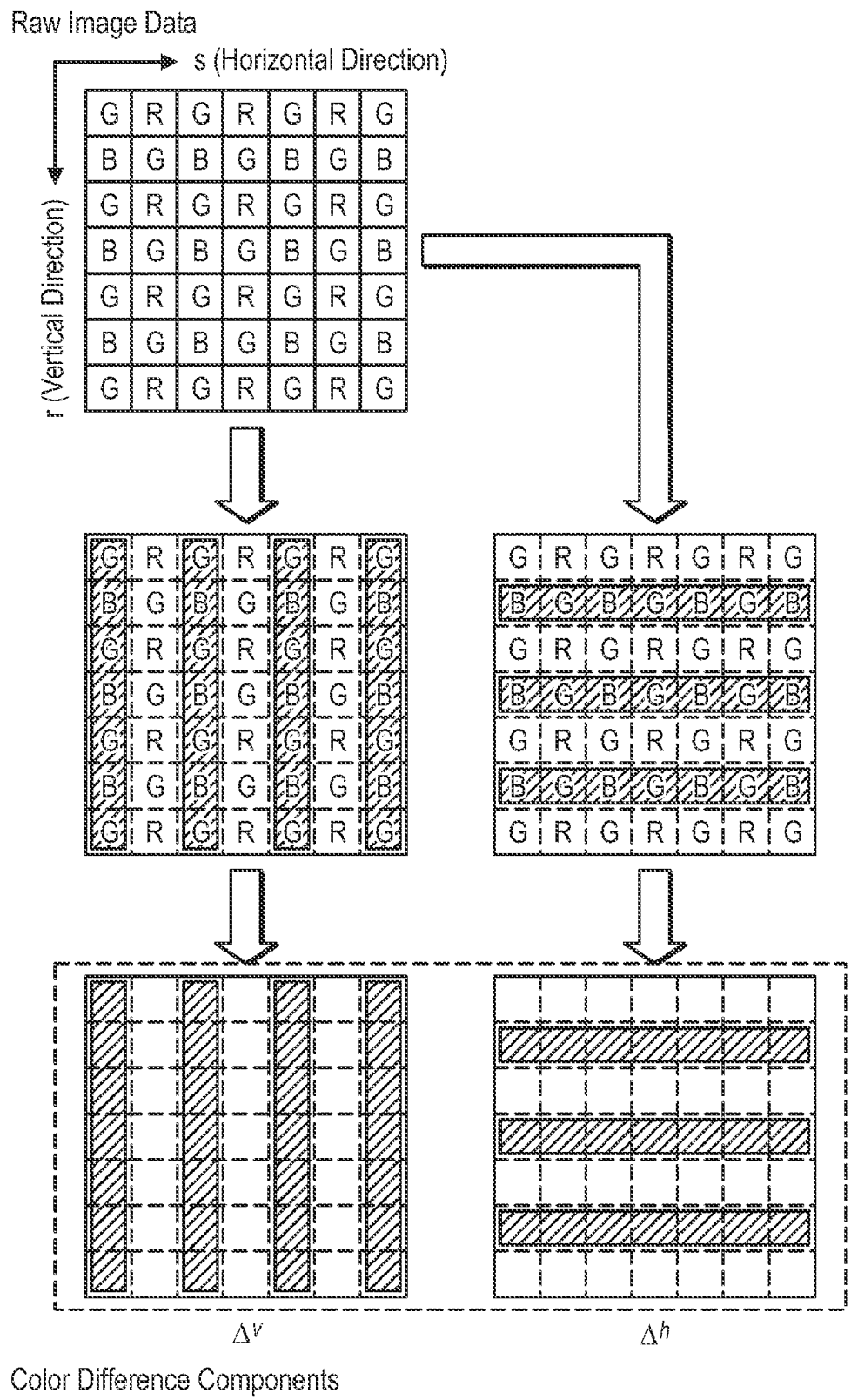
FIG. 4 conceptually shows a process of converting raw image data into data of color difference components.

FIG. 4 conceptually shows a process of converting raw image data into data of color difference components. The top of FIG. 4 shows a conceptual view of the raw image data read from the image sensor 24. The raw image data obtained with the Bayer color filter array has the mosaic arrangement of the R, G, and B components. In a horizontal direction, there are only two types of pixel rows in the raw image data: pixel rows having alternately arranged G pixels (pixels with G component) and R pixels (pixels with R component) and pixel rows having alternately arranged G pixels and B pixels (pixels with B component). In a vertical direction, there are similarly only two types of pixel columns in the raw image data: pixel columns having alternately arranged G pixels and R pixels and pixel columns having alternately arranged G pixels and B pixels. The middle of FIG. 4 conceptually shows that the raw image data consists of only the pixel rows of alternate G pixels and R pixels and the pixel rows of alternate G pixels and B pixels in the horizontal direction while consisting of only the pixel columns of alternate G pixels and R pixels and the pixel columns of alternate G pixels and B pixels.

Based on this result of observation, the color image data generation process of this embodiment converts the raw image data of the R, G, and B components into data representing differences of color components of the pixel rows in the horizontal direction (color difference components in the horizontal direction) and data representing differences of color components of the pixel columns in the vertical direction (color difference components in the vertical direction). For example, the raw image data is converted into data on color difference components between G and R components with regard to the pixel rows or the pixel columns of alternate G pixels and R pixels. Similarly the raw image data is converted into data on color difference components between G and B components with regard to the pixel rows or the pixel columns of alternate G pixels and B pixels. Calculation formulae for calculating the color difference components will be described in detail later.

The bottom of FIG. 4 conceptually shows the color difference components in the horizontal direction and in the vertical direction thus obtained. A left-side view on the bottom shows color difference components $\Delta^v$ in the vertical direction obtained by processing the raw image data in the vertical direction. Each of hatched pixel columns is a pixel column of alternate G pixels and B pixels. Each color difference component $\Delta^v$ on this pixel column accordingly represents a color difference component between the G component and the B component. Each of remaining non-hatched pixel columns is a pixel column of alternate G pixels and R pixels. Each color difference component $\Delta^v$ on this pixel column accordingly represents a color difference component between the G component and the R component. The raw image data in the horizontal direction is similarly processable. Each of hatched pixel rows gives color difference components $\Delta^h$ between the G pixels and the B pixels. Each of the remaining non-hatched pixel rows gives color difference components $\Delta^h$ between the G pixels and the R pixels.

FIGS. 5A and 5B show calculation formulae for calculating the color difference components from the raw image data. FIG. 5A shows calculation formulae for calculating the color difference component $\Delta_{(r,s)}^v$ in the vertical direction, and FIG. 5B shows calculation formulae for calculating the color difference component $\Delta_{(r,s)}^h$ in the horizontal direction. In these calculation formulae, z denotes values of the raw image data obtained by the image sensor 24, and $z_{(r,s)}$ shows a value at a specific position defined by an r-th pixel position downward from the position of the origin set in an image and an s-th pixel position rightward from the position of the origin (see the top of FIG. 4).

Referring to FIG. 5A, the description regards the calculation formulae for calculating the color difference components $\Delta^v$ in the vertical direction. When a target pixel $z_{(r,s)}$ as an object of computation of the color difference component $\Delta_{(r,s)}^v$ is a pixel with the G component (G pixel), the upper calculation formula of FIG. 5A is adopted. The process first calculates an average of values of pixels $z_{(r-1,s)}$ and $z_{(r+1,s)}$ of non-G-components above and below the target pixel (that is, a second term surrounded by the one-dot chain line) and subtracts the calculated average from the G component of the target pixel (that is, a first term surrounded by the broken line) to calculate a color difference component $\Delta(r,s)^v$ of the target pixel in the vertical direction. As explained above with reference to FIG. 4, the pixels $z_{(r-1,s)}$ and $z_{(r+1,s)}$ above and below the target G pixel may be R pixels or B pixels but are always pixels of an identical color component. Thus, the second term surrounded by the one-dot chain line in the upper calculation formula in FIG. 5A accordingly represents either the R component or the B component.

Application of the identical calculation formula to the G pixel vertically surrounded by the R pixels or the B pixels gives two different types of the color difference components $\Delta^v$. When the pixels above and below the G pixel under consideration are the R pixels, the resulting color difference component $\Delta_{(r,s)}^v$ in the vertical direction represents the color difference component between the G component and the R component. When the pixels above and below the G pixel under consideration are the B pixels, on the other hand, the resulting color difference component $\Delta(r,s)^v$ in the vertical direction represents the color difference component between the G component and the B component.

The color difference components $\Delta^v$ in the vertical direction are similarly computable in pixel locations with the original R or B component. For example, when a target pixel as the object of computation of the color difference component $\Delta_{(r,s)}^v$ is an R or B pixel, pixels $z_{(r-1,s)}$ and $z_{(r+1,s)}$ above and below the target pixel $z_{(r,s)}$ are G pixels as explained above with reference to FIG. 4. As shown in the lower calculation formula of FIG. 5A, the average of $z_{(r-1,s)}$ and $z_{(r+1,s)}$ is believed to specify the G component in the target pixel as the object of computation of the color difference component $\Delta_{(r,s)}^v$. Subtraction of the tone value of the target pixel from the specified G component determines the color difference component $\Delta_{(r,s)}^v$.

The identical calculation formula is applicable to computation of the color difference components $\Delta^v$ in the vertical direction, with regard to both the R pixel and the B pixel set as the target pixel. It should, however, be noted that the R pixel and the B pixel processed as the target pixel give two different types of the color difference components $\Delta^v$. When the target pixel $z_{(r,s)}$ is the R pixel, the resulting color difference component $\Delta_{(r,s)}^v$ represents the color difference component between the G component and the R component. When the target pixel $z_{(r,s)}$ is the B pixel, on the other hand, the resulting color difference component $\Delta_{(r,s)}^v$ represents the color difference component between the G component and the B component.

The color difference components $\Delta^h$ in the horizontal direction are computable in the same manner as the color difference components $\Delta^v$ in the vertical direction explained above. The computation of the color difference components $\Delta^h$ is explained briefly with reference to FIG. 5B. As shown in the upper calculation formula of FIG. 5B, subtraction of a second term surrounded by the one-dot chain line from a first term surrounded by the broken line on the right side gives the color difference component $\Delta_{(r,s)}^h$ of the G pixel in the horizontal direction. In this formula, the element $z_{(r,s)}$ represents the original G component of the raw image data in a target pixel whereas the element $z_{(r,s-1)}$ and $z_{(r,s+1)}$ denote values of the raw image data in pixels on the left and on the right of the target pixel $z_{(r,s)}$. The pixels $z_{(r,s-1)}$ and $z_{(r,s+1)}$ on the left and the right of the target G pixel may be R pixels or B pixels but are always pixels of an identical color component.

In computation of the color difference component $\Delta_{(r,s)}{}^h$ in the horizontal direction with regard to an R or B target pixel $z_{(r,s)}$, the pixels $z_{(r,s-1)}$ and $z_{(r,s+1)}$ on the left and the right of the target pixel are the G pixels. As shown in the lower calculation formula of FIG. 5B, subtraction of a second term surrounded by the one-dot chain line (a tone value of the target pixel) from a first term surrounded by the broken line (an average of values of the left and the right pixels) gives the color difference component $\Delta_{(r,s)}{}^h$ in the horizontal direction.

The identical calculation formulae are applicable to computation of the color difference components $\Delta^h$ in the horizontal direction, with regard to the target G pixel having the R pixels or the B pixels as the left and the right pixels and with regard to both the R pixel and the B pixel set as the target pixel other than the G pixel. The computation, however, gives two different types of the color difference components $\Delta_{(r,s)}{}^h$, that is, the color difference component between the G component and the R component and the color difference component between the G component and the B component.

As clearly understood from the comparison between FIGS. 5A and 5B, the calculation formulae used for computation of the color difference component $\Delta_{(r,s)}{}^v$ in the vertical direction are significantly similar to the calculation formulae used for computation of the color difference component $\Delta_{(r,s)}{}^h$ in the horizontal direction. Therefore, the processing flow can be standardized for computation of both the color difference components $\Delta_{(r,s)}{}^v$ and $\Delta_{(r,s)}{}^h$ in the two different directions. In addition, each of the two formulas shown in FIGS. 5A and 5B uses identical calculation formulae to desirably attain the simplicity and the high speed of the advanced processing with the two different types of the color difference components in each of the two (horizontal and vertical) directions. This enables the simplicity and the high speed of the overall processing, which is comparable in terms of computational efficiency to the conventional simple processing.

At step S102 in the flowchart of FIG. 3, the raw image data captured by the image sensor 24 is converted into the color difference components $\Delta^v$ in the vertical direction and the color difference components $\Delta^h$ in the horizontal direction. At step S104, the color difference components $\Delta^v$ and $\Delta^h$ are enhanced by applying low pass filters to the color difference components $\Delta^v$ in the vertical direction and the color difference components $\Delta^h$ in the horizontal direction for the purpose of removal of possible noise from these color difference components. As explained later, the color image data generation process disclosed herein uses the color difference components for detection of the orientation of the edges included in the image. Application of the low pass filters to image data is generally undesirably since the low pass filters have a tendency to blur the edges and lower the detection accuracy of the edges. However, by enhancing the color difference components using the low-pass filters, the procedure of this embodiment enables stable detection of the edge orientations with extremely high accuracy as described in greater detail below.

FIGS. 6A, 6B, and 6C show low pass filters applied for removal of noise included in color difference components. FIG. 6A shows two low pass filters to be applied to the color difference components $\Delta^v$ in the vertical direction and the color difference components $\Delta^h$ in the horizontal direction. FIG. 6B shows an example of the vertical directional filter window centered in the color difference component $\Delta_{(r,s)}{}^v$ in the vertical direction. FIG. 6C shows an example of the horizontal directional filter window centered in the color difference component $\Delta_{(r,s)}{}^h$ in the horizontal direction. In these figures, a target pixel as an object of application of the low pass filter is represented by a hatched rectangle. Each low pass filter of these embodiments multiplies color difference values within the filter window (that is, five pixels in these embodiments) with the corresponding weights and sums up the results of these multiplications to produce an output color difference component in the target pixel. It is noted that the method enables the use of the filter with the weights other than those presented in this embodiment and the window of the length different from one used in the embodiment.

Each row of the color difference components $\Delta^h$ in the horizontal direction or each column of the color difference components $\Delta^v$ in the vertical direction consists of the color differences of an identical type (that is, color difference component between the G component and the R component or the color difference component between the G component and the B component, as explained previously). Therefore, the low pass filters are applicable to the color difference components $\Delta^v$ in the vertical direction and the color difference components $\Delta^h$ in the horizontal direction without taking into account such different types of the color difference components. The color image data generation process disclosed herein thus attains the extreme simplicity and the high speed of the advanced processing.

Referring back to the flowchart of FIG. 3, after computation of the enhanced version, denoted as $\hat{\Delta}^v$, of color difference components $\Delta^v$ in the vertical direction and the enhanced version, denoted as $\hat{\Delta}^h$, of the color difference components $\Delta^h$ in the horizontal direction in the above manner, the color image data generation process disclosed herein creates an edge directional map using the enhanced color difference components (edge directional map creation process) (step S106). The edge directional map indicates that demosaicking should be performed in the vertical direction, the horizontal direction, or using samples located in both the vertical and horizontal directions. The edge directions may not be necessarily set for all the pixels but should be set at least for the non-G pixels (that is, the R pixels and the B pixels) or the G pixels. The color image data generation process disclosed herein detects the edge orientations based on the enhanced color difference components $\hat{\Delta}^v$ in the vertical direction and $\hat{\Delta}^h$ in the horizontal direction as described in greater detail below. This ensures the accurate and relatively high-speed detection of the edge orientations.

After creation of the edge directional map, the CPU determines the tone value of the G component in each target pixel other than the G pixel (that is, either the R pixel or the B pixel) by interpolation (luminance component interpolation process) (step S108). The luminance component interpolation process refers to the edge directional map and performs interpolation with the values of the G component in adjacent pixels to determine the adequate value of the G component in the non-G target pixel. The details of this luminance component interpolation process will be described in greater detail below.

The CPU subsequently clamps interpolated G Components with signal overshoots or undershoots to the closest neighboring original G component (luminance component clamping process) (step S110). The luminance component clamping process uses the refined multistage concept to prevent geometric artifacts in the captured image due to the clamping operations. Using this multistage concept, the luminance component clamping process aims at altering the interpolated G values in the areas with significant chromatic edges where signal overshoots and undershoots can result in color artifacts and in the dark areas where signal overshoots and undershoots can increase the level of the noise rather than altering all the interpolated values. The details of this luminance component clamping process will be described in greater detail below.

The CPU subsequently performs interpolation of the missing chrominance components (chrominance component interpolation process) (step S112). The processing of step S112 thus interpolates the R component in pixel locations with the original G or B component and the B component in pixel locations with the original G or R component. The details of the chrominance component interpolation process will be described in greater detail below.

The CPU subsequently performs enhancement of the interpolated chrominance components (chrominance component enhancement process) (step S114). The processing of step S114 thus enhances the R and P components that were interpolated during the processing of step S112. The details of the chrominance component enhancement process will be described in greater detail below.

On completion of the enhancement of the interpolated chrominance components (steps S114), all the pixels have obtained all the color components R, G, and B. The CPU subsequently outputs the obtained RGB color components as color image data generated from the raw image data (step S116) and terminates the color image data generation process of FIG. 3.

C. Edge Directional Map Creation Process

Figure 7:
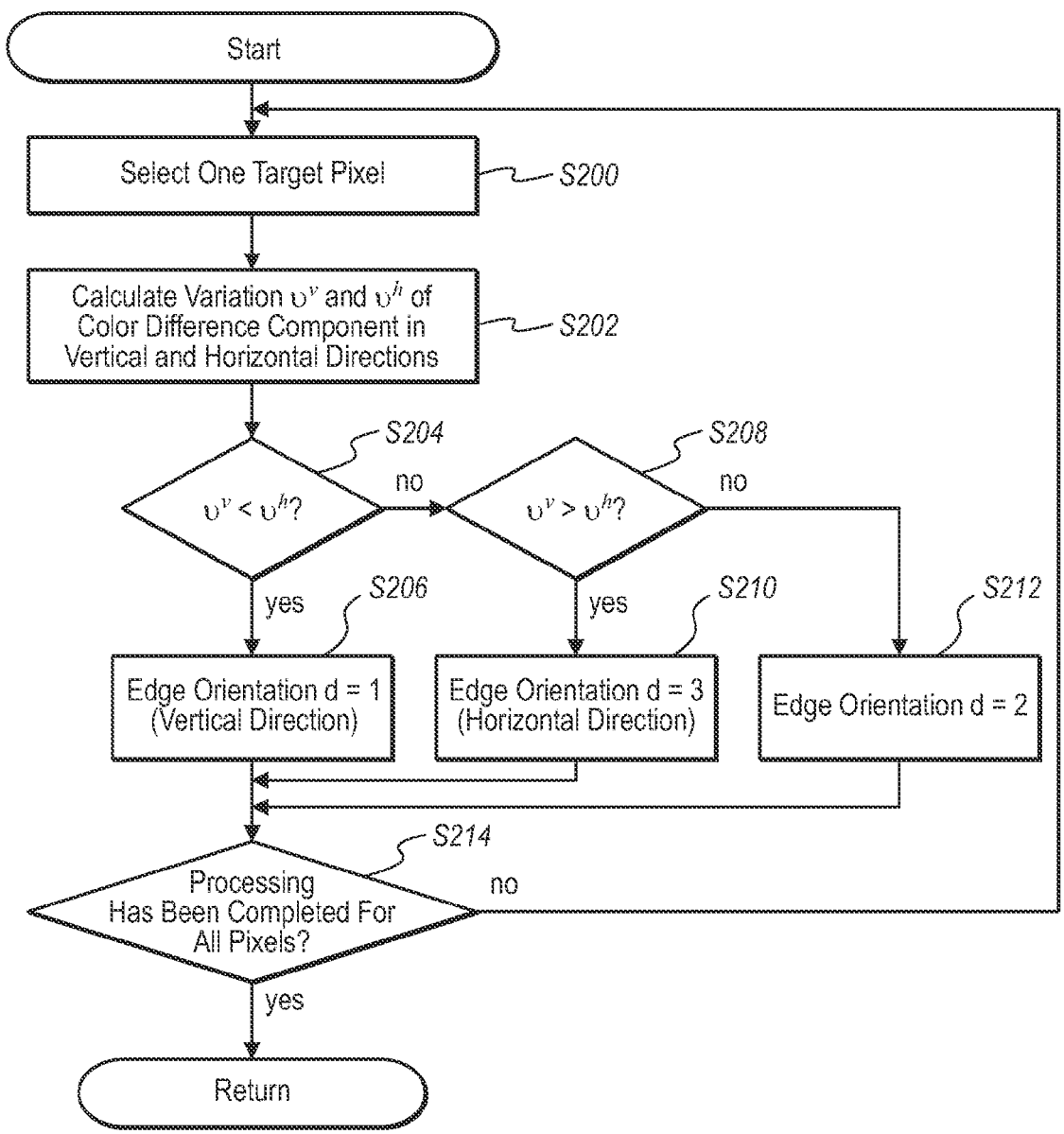
FIG. 7 is a flowchart showing the details of an edge directional map creation process executed in the color image data generation process of FIG. 3 by the image processing apparatus.

FIG. 7 is a flowchart showing the details of the edge directional map creation process executed at step S106 in the color image data generation process of FIG. 3 by the image processing apparatus 30.

As shown in FIG. 2, since the raw image has a discrete appearance due to the mosaic arrangement of its color components, it is difficult to detect edges with high accuracy from a variation in tone value with regard to each of the color components R, G, and B. Fortunately, this is not the case for color difference components. With regard to each pixel column or pixel row having an alternate arrangement of the G component and the R component, the raw image data is converted into data of color difference components between the G component and the R component. With regard to each pixel column or pixel row having an alternate arrangement of the G component and the B component, the raw image data is converted into data of color difference components between the G component and the B component. Thus, color difference components are more suitable for accurate edge orientation detection than the raw mosaic data.

As already noted, edge orientations may be determined only in non-G pixel positions (that is, in pixels of the original R or B components) in order to enable efficient processing. In such high speed processing, the edge directional map creation process first selects one non-G target pixel as an object of detection of the edge orientation (step S200) and calculates a variation $\upsilon_{(r,s)}^v$ of the color difference component in the vertical direction and a variation $\upsilon_{(r,s)}^h$ of the color difference component in the horizontal direction (step S202). The variation $\upsilon_{(r,s)}^v$ in the vertical direction is calculated naturally from the color difference components $\hat{\Delta}^v$ in the vertical direction. The variation $\upsilon_{(r,s)}^h$ in the horizontal direction is calculated in the similar manner to the calculation of the variation $\upsilon_{(r,s)}^v$ in the vertical direction except the use of the color difference components $\hat{\Delta}^h$ in the horizontal direction for the computation. It is noted that both $\upsilon_{(r,s)}^v$ and $\upsilon_{(r,s)}^h$ can also be calculated using the original color difference components $\Delta^v$ and $\Delta^h$, as the method enables the edge orientation detection process with such signals. The use of their enhanced versions $\hat{\Delta}^v$ and $\hat{\Delta}^h$, however, usually increases the accuracy of the edge orientation detection process.

FIGS. 8A and 8B show an example of calculation of the variation $\upsilon_{(r,s)}^v$ in the vertical direction from the color difference components $\hat{\Delta}^v$ in the vertical direction. FIG. 8A shows a calculation formula, and FIG. 8B conceptually shows calculation of the variation $\upsilon_{(r,s)}^v$ in the vertical direction according to the calculation formula of FIG. 8A. A hatched rectangle in FIG. 8B represents the position of a target pixel. Open arrows shown in FIG. 8B represent computation of the squares of the differences between the vertical color difference components. FIG. 8B shows the nine squares obtained from the nine pairs of pixels arrayed in the vertical direction. The summation of these nine squares is specified as the variation $\upsilon_{(r,s)}^v$ in the vertical direction with regard to the target pixel.

FIGS. 9A and 9B show an example of calculation of the variation $\upsilon_{(r,s)}^h$ in the horizontal direction from the color difference components $\hat{\Delta}^h$ in the horizontal direction. FIG. 9A shows a calculation formula, and FIG. 9B conceptually shows calculation of the variation $\upsilon_{(r,s)}^h$ in the horizontal direction according to the calculation formula of FIG. 9A. As shown by open arrows in FIG. 9B, the computation process successively calculates the nine squares of respective differences between the horizontal color difference components. The summation of nine squares is specified as the variation $\upsilon_{(r,s)}^h$ in the horizontal direction with regard to the target pixel. It should be understood that this invention is not limited to the embodiments presented in FIGS. 8 and 9 and that any other configuration of color difference components can be used instead to determine edge orientations.

As shown in the edge directional map creation process disclosed herein, it is important to compute the variation $\upsilon_{(r,s)}^v$ in the vertical direction based on the differences between vertical color difference components from the same pixel column. In a similar manner, it is important to calculate the variation $\upsilon_{(r,s)}^h$ in the horizontal direction based on the horizontal color difference components from the same pixel row. As already noted, each column and row of color difference components consists of the color differences of one type (that is, G-R or G-B).

Referring back again to the flowchart of FIG. 7, the variation $\upsilon_{(r,s)}^v$ in the vertical direction and the variation $\upsilon_{(r,s)}^h$ in the horizontal direction are compared to each other with regard to the target pixel $z_{(r,s)}$ to determine if the variation $\upsilon_{(r,s)}^v$ in the vertical direction is less than the variation $\upsilon_{(r,s)}^h$ in the horizontal direction (step S204). If so (step S204: yes), it is determined that an edge goes through the target pixel $z_{(r,s)}$ in the vertical direction and a value $d_{(r,s)}$ representing the edge orientation in the target location (r,s) is then set equal to 1 (step S206).

If not (step S204: no), the variation $\upsilon_{(r,s)}^v$ in the vertical direction and the variation $\upsilon_{(r,s)}^h$ in the horizontal direction are compared each other to determine if the variation $\upsilon_{(r,s)}^v$ in the vertical direction is greater than the variation $\upsilon_{(r,s)}^h$ in the horizontal direction (step S208). If so (step S208: yes), it is determined that an edge goes through the target pixel $z_{(r,s)}$ in the horizontal direction and a value $d_{(r,s)}$ representing the edge orientation in the target location (r,s) is then set equal to 3 (step S210). If not (step S208: no), it is determined that no edge goes through the target pixel $z_{(r,s)}$ and a value $d_{(r,s)}$ representing the edge orientation in the target location (r,s) is then set equal to 2 (step S212).

Thus, the $d_{(r,s)}$ value indicates that demosaicking should be performed in the vertical direction (for $d_{(r,s)}=1$), the horizontal direction (for $d_{(r,s)}=3$), or using samples located in both the vertical and horizontal directions (for $d_{(r,s)}=2$). Thus, unlike existing methods which detect edges using intensity gradients of the acquired image pixels, the edge directional map creation process of FIG. 7 allows high-accurate edge detection using square differences of enhanced luminance-chrominance difference values.

The use of squares of the differences between the color difference components enables detection of the edge orientations without taking into account the signs of the differences between the color difference components. One possible modification may thus calculate the absolute values of respective differences between the color difference components, instead of calculation of their squares. The summation of the absolute values with regard to the adjacent pixels gives the variation $\upsilon_{(r,s)}^v$ in the vertical direction or the variation $\upsilon_{(r,s)}^h$ in the horizontal direction. The square, however, enhances the difference between the color difference components, compared with the absolute value and thus increases the detection accuracy of the edge orientation. It should be understood that this invention is not limited to the absolute or square differences and that any other difference or similarity measure can be used instead to determine edge orientations.

Referring back again to the flowchart of FIG. 7, as described above, the edge directional map creation process disclosed herein calculates the variation $\upsilon_{(r,s)}^v$ of the color difference component in the vertical direction and the variation $\upsilon_{(r,s)}^h$ of the color difference component in the horizontal direction (step S202) and detects the edge orientation of the target pixel based on the comparison between the variation $\upsilon_{(r,s)}^v$ in the vertical direction and the variation $\upsilon_{(r,s)}^h$ in the horizontal direction (steps S204 to S212). After detection of the edge orientation in the target pixel selected at step S200, the CPU determines whether the edge orientations have been detected with regard to all the pixels (step S214). When there is any unprocessed pixel (step S214: no), the edge directional map creation process returns to step S200 to select another target pixel among unprocessed pixels and executes the subsequent series of processing. On completion of detection of the edge orientations with regard to all the pixels (step S214: yes), the edge directional map creation process of FIG. 7 is terminated. FIGS. 10A and 10B show two sets of example calculation formulae for calculating an edge directional map using the variations of horizontal and vertical directional signals, such as those shown in FIGS. 8A and 9A. The edge directional map creation process can be either unconstrained (FIG. 10A) or constrained (FIG. 10B). In the constrained case, the variations have to exceed a certain value (e.g., a predetermined variation constraint Φ) in order to reduce the influence of outliers in the horizontal and vertical directional signals.

The edge directional map creation process disclosed herein enables detection of the edge orientations included in the raw image data with extremely high accuracy. Interpolation of the missing color components in the respective pixels constituting the raw image data is performed with reference to this highly accurate edge directional map. This ensures adequate interpolation without the occurrence of pseudo colors.

D. Luminance Component Interpolation Process

As described above with reference to the flowchart of FIG. 3, the color image data generation process disclosed herein starts the luminance component interpolation process (step S108), after creation of the edge directional map (step S106). The process interpolates the G component in the pixels other than the G pixels (that is, the R pixels and the B pixels).

Figure 11:
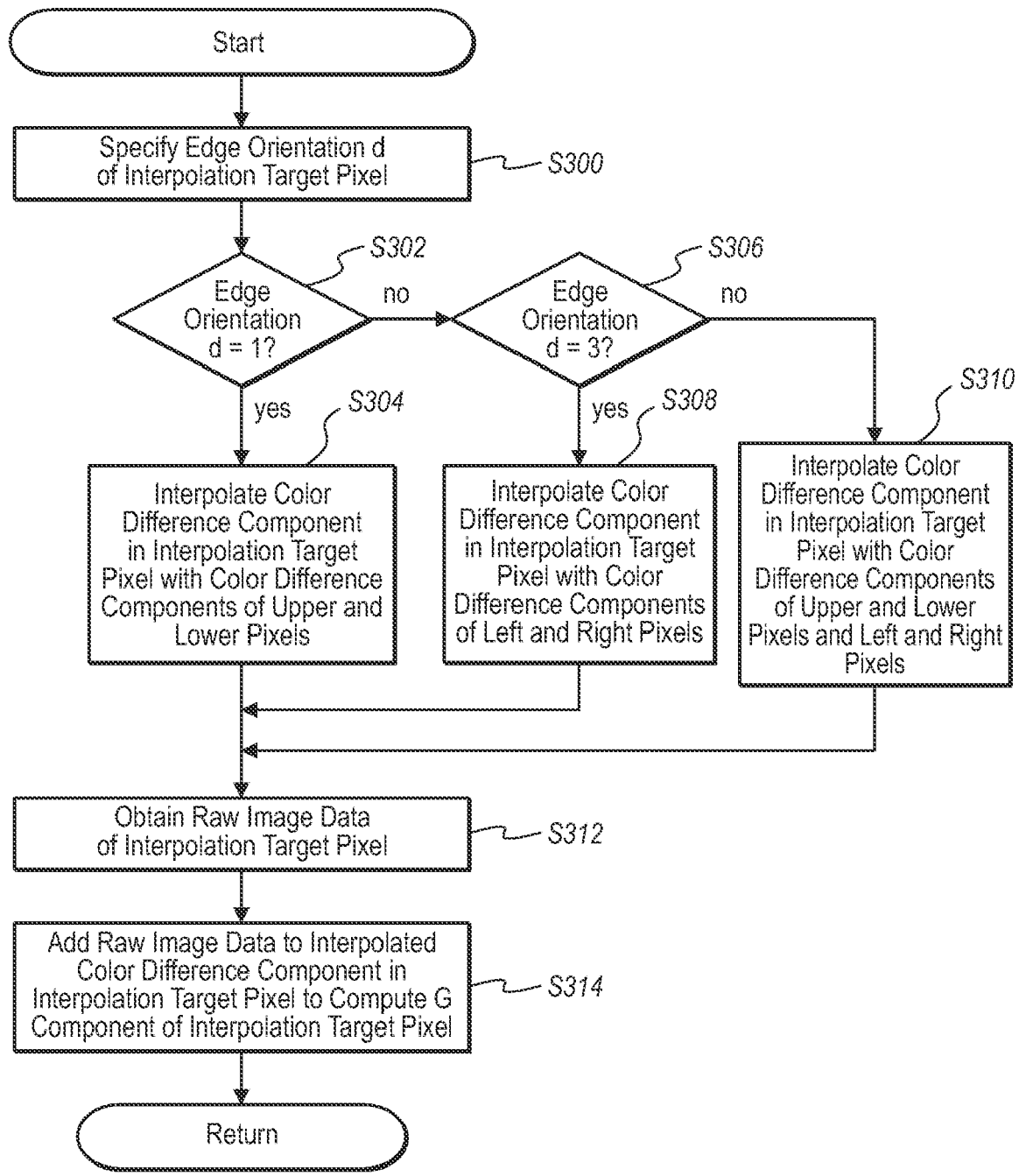
FIG. 11 is a flowchart showing the details of a luminance component interpolation process executed in the color image data generation process of FIG. 3 by the image processing apparatus.

FIG. 11 is a flowchart showing the details of the luminance component interpolation process to interpolate the G component in the R pixels and the B pixels. The luminance component interpolation process first refers to the created edge directional map to specify the edge orientation $d_{(r,s)}$ in each interpolation target pixel as an object of interpolation (step S300). To complete the luminance component interpolation process, the edge directional map should have the edge orientations d detected for the non-G pixels (that is, the R pixels and the B pixels). Alternatively, if edge orientations are available only in G pixel locations, then the edge orientation in the luminance interpolation target pixel (that is, non-G pixel) can be determined as the function (for example, median or average) of the edge orientation values in the pixels adjacent to the target pixel. In this embodiment, however, in interpolation of the G component in the non-G pixels, the edge orientation $d_{(r,s)}$ is specified by referring to the edge directional map.

The luminance component interpolation process subsequently determines whether the specified edge orientation $d_{(r,s)}$ is equal to 1 (step S302). If so (step S302: yes), a color difference component of the interpolation target pixel is interpolated with the vertical color difference components of pixels above and below the interpolation target pixel (step S304).

When the specified edge orientation $d_{(r,s)}$ is not equal to 1 (step S302: no), the luminance component interpolation process subsequently determines whether the specified edge orientation $d_{(r,s)}$ is equal to 3 (step S306). If so (step S306: yes), a color difference component of the interpolation target pixel is interpolated with the horizontal color difference components of pixels on the left and on the right of the interpolation target pixel (step S308). If not, (step S306: no), the specified edge orientation $d_{(r,s)}$ is equal to 2, and a color difference component of the interpolation target pixel is interpolated with the vertical color difference components of pixels above and below the interpolation target pixel and the horizontal color difference components of pixels on the left and on the right of the interpolation target pixel (step S310).

The luminance component interpolation process then obtains the raw image data of the interpolation target pixel (step S312) and adds the raw image data to the interpolated color difference component of the interpolation target pixel to compute the G component of the interpolation target pixel (step S314). This series of processing will now be described in greater detail.

As demonstrated in FIGS. 4 and 5, both the color difference component in the vertical direction and the color difference component in the horizontal direction are available in each pixel location. Since interpolation in the state of a less variation (closer to the steady state) is expected to have the better interpolation result than interpolation in the state of a greater variation, the color difference component in the vertical direction having a less variation is used for the computation of the G component.

As disclosed in FIGS. 5A and 5B, in the interpolation target pixel of the original R component, both the color difference component in the vertical direction and the color difference component in the horizontal direction are obtained by subtraction of the R component from the G component. In a similar manner, in the interpolation target pixel of the original B component, both the color difference component in the vertical direction and the color difference component in the horizontal direction are obtained by subtraction of the B component from the G component. Addition of the raw image data to the color difference component thus immediately determines the G component in the interpolation target pixel. The color difference component used for computation of the G component should preferably be the color difference component enhanced by the low pass filter shown in FIG. 6A.

The color difference component of the interpolation target pixel may be calculated from the color difference components of adjacent pixels, instead of being directly read. If the edge orientation $d_{(r,s)}$ in the interpolation target pixel is equal to 1, this modified procedure may read the color difference components of pixels above and below the interpolation target pixel in the vertical direction and calculate the color difference component in the interpolation target pixel from the read-out color difference components. In a similar manner, if the edge orientation $d_{(r,s)}$ in the interpolation target pixel is equal to 3, this modified procedure may read the color difference components of pixels on the left and the right of the interpolation target pixel in the horizontal direction. The luminance component interpolation process of FIG. 11 calculates the color difference component of the interpolation target pixel from the color difference components of the adjacent pixels at step S304, step 308, or at step S310. Another modified procedure may read the color difference components of the pixels in a larger neighborhood of the interpolation target pixel in order to calculate the color difference component in the interpolation target pixel from the read-out color difference components.

After computation of the G component in all the interpolation target pixels as described above, the CPU terminates the luminance component interpolation process of FIG. 11 and goes back to the color image data generation process of FIG. 3. The color image data generation process subsequently starts the luminance component clamping process to avoid color artifacts in the output image (step S110). FIGS. 12A and 12B show two sets of example calculation formulae for interpolating luminance components.

E. Luminance Component Clamping Process

Figure 13:
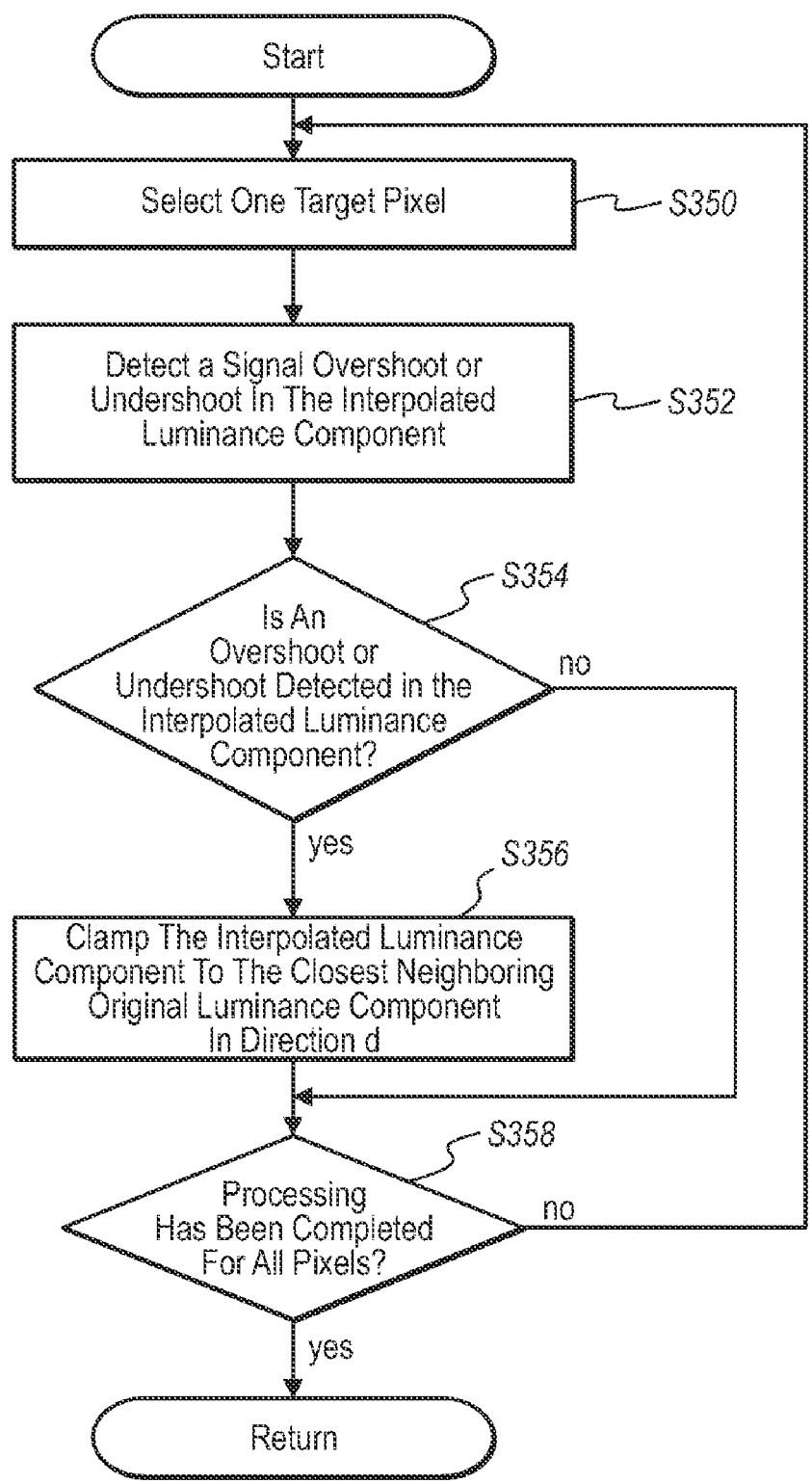
FIG. 13 is a flowchart showing the details of a luminance component clamping process executed in the color image data generation process of FIG. 3 by the image processing apparatus.

FIG. 13 is a flowchart showing the details of the luminance component clamping process executed at step S110 in the color image data generation process of FIG. 3 by the image processing apparatus 30.

As noted above, the interpolated G components are obtained using color differences. Such a concept produces high-accurate results in the areas which exhibit significant both spatial (intra-channel) and spectral (inter-channel) correlations. Unfortunately, the underlying assumption of small color differences (or significant spatial and spectral correlations) in a local image area often breaks down in chromatic image areas with high-contrast edges, thus resulting in the so-called signal undershoots and overshoots, which are the demosaicked values smaller or larger than the values of the neighboring original color components corresponding to the same color band as the demosaicked sample under consideration. Since (substantial) signal undershoots and overshoots are perceived as color artifacts present in the demosaicked images, the demosaicked value should be clamped before its storage in the demosaicked image. This is especially critical when demosaicking the G components because the wavelength of the G color band is close to the peak of the human luminance frequency response. Moreover, since the demosaicked G channel is often used to demosaick the R and B components, any demosaicking error present in the luminance (that is, G) channel is usually amplified and propagated to the chrominance (that is, R and B) channels. To avoid these problems, the interpolated G components representing significant overshoots and undershoots may be clamped in order to preserve the desired local image characteristics.

It should be understood that there is no need for the clamping process to affect all interpolated G values as such processing can lead to geometric artifacts in the captured image. Due to the refined multistage concept, the clamping process here rather aims at altering the interpolated G values in the areas with significant chromatic edges where signal overshoots and undershoots can result in color artifacts and in dark areas where signal overshoots and undershoots can increase the level of the noise.

The luminance component clamping process first selects one target pixel with the interpolated G component as an object of the clamping process (step S350). After selecting one target pixel, the clamping process next detects a signal overshoot or undershoot in the interpolated G component (step S352). Next, the clamping process determines whether a signal overshoot or undershoot is detected in the interpolated G component (step S354).

After the interpolated G component is clamped to the closest original neighboring original G component located in the direction in which demosaicking is being performed (step S356), or when no signal overshoot nor undershoot is detected in the interpolated G component (step S354: no), the CPU determines whether the clamping process has been completed with regard to all the pixels with a demosaicked G component (step S358). When there is any unprocessed pixel with an interpolated G component (step S358: no), the edge map creation process returns to step S300 to select another target pixel among unprocessed pixels and executes the subsequent series of processing. On completion of the clamping process with regard to all the pixels with an interpolated G component (step S358: yes), the clamping process of FIG. 13 is terminated.

F. Chrominance Component Interpolation Process

As explained previously, the chrominance interpolation process interpolates the remaining color components in each pixel, after the luminance component clamping process has been completed in all locations with the interpolated luminance component.

In order to avoid color artifacts in the demosaicked image, the chrominance interpolation process takes advantage of the available luminance-chrominance signals and interpolates both the B component in the original R pixels and the R component in the original B pixels using luminance-chrominance difference components of four diagonally arranged pixels adjacent to the interpolation target pixel. These four luminance-chrominance difference components are used to calculate the color difference component of the interpolation target pixel.

As shown in FIG. 4, if the target interpolation location is the original R component, its four diagonally adjacent neighbors are pixels of the original B components. Therefore, the desired type of the luminance-chrominance signal in the target location can be calculated based on the G component and the B component in each of the four diagonally arranged pixels adjacent to the interpolation target pixel. In a similar manner, if the target interpolation location is the original B component, its four diagonally adjacent neighbors are pixels of the original R components. Therefore, the desired type of the luminance-chrominance signal in the target location can be calculated based on the G component and the R component in each of the four diagonally arranged pixels adjacent to the interpolation target pixel. To enable high-speed processing the desired type of luminance-chrominance signal in the interpolation target location is calculated as average of differences between the luminance value and the original chrominance value in each of the four diagonally adjacent pixels. This average value is then added to the luminance (G) value available in the target pixel to produce missing chrominance (R or B) value in the target chrominance (B or R) location.

After interpolation of the chrominance component (that is, R or B) in all pixel locations with the other original chrominance component (that is, B or R), the chrominance component interpolation process determines two chrominance components (that is, R and B) in all pixel locations of the original luminance component (that is, G). Both chrominance components are now available in each location of the original chrominance component. As can be seen in FIG. 4, four such pixel locations are vertically and horizontally adjacent to each interpolation target pixel of the original luminance component. Therefore, if the chrominance component to be interpolated is the R component, the desired type of the luminance-chrominance signal in the target pixel location can be calculated based on the G component and the R component in each of the four vertically and horizontally arranged pixels adjacent to the interpolation target pixel. In a similar manner, if the chrominance component to be interpolated is the B component, the desired type of the luminance-chrominance signal in the target pixel location can be calculated based on the G component and the B component in the four vertically and horizontally arranged pixels adjacent to the interpolation target pixel. To enable high-speed processing the desired type of luminance-chrominance signal in the interpolation target location can be calculated as an average of differences between the luminance value and the chrominance value in each of these four adjacent pixels or only of two pixels (either vertical or horizontal) if the edge orientations obtained in the edge directional map creation process (S106) are taken into the consideration. This average value is then added to the original luminance (G) value available in the interpolation target pixel to produce missing chrominance (R or B) value.

FIGS. 14A, 14B, 14C, and 14D show example calculation formulae for interpolating chrominance components. In particular, operating in B CFA locations (even r, odd s), the R components $x_{(r,s)1}$ may be demosaicked using the formula of FIG. 14A. Next, B components $x_{(r,s)3}$ may be demosaicked in R CFA locations (odd r, even s) using the formula of FIG. 14B. Then, the R and B components in G CFA locations (odd r, odd s) and (even r, even s) may be demosaicked using the formulas of FIGS. 14C and 14D, respectively.

G. Chrominance Component Enhancement Process

Figure 15:
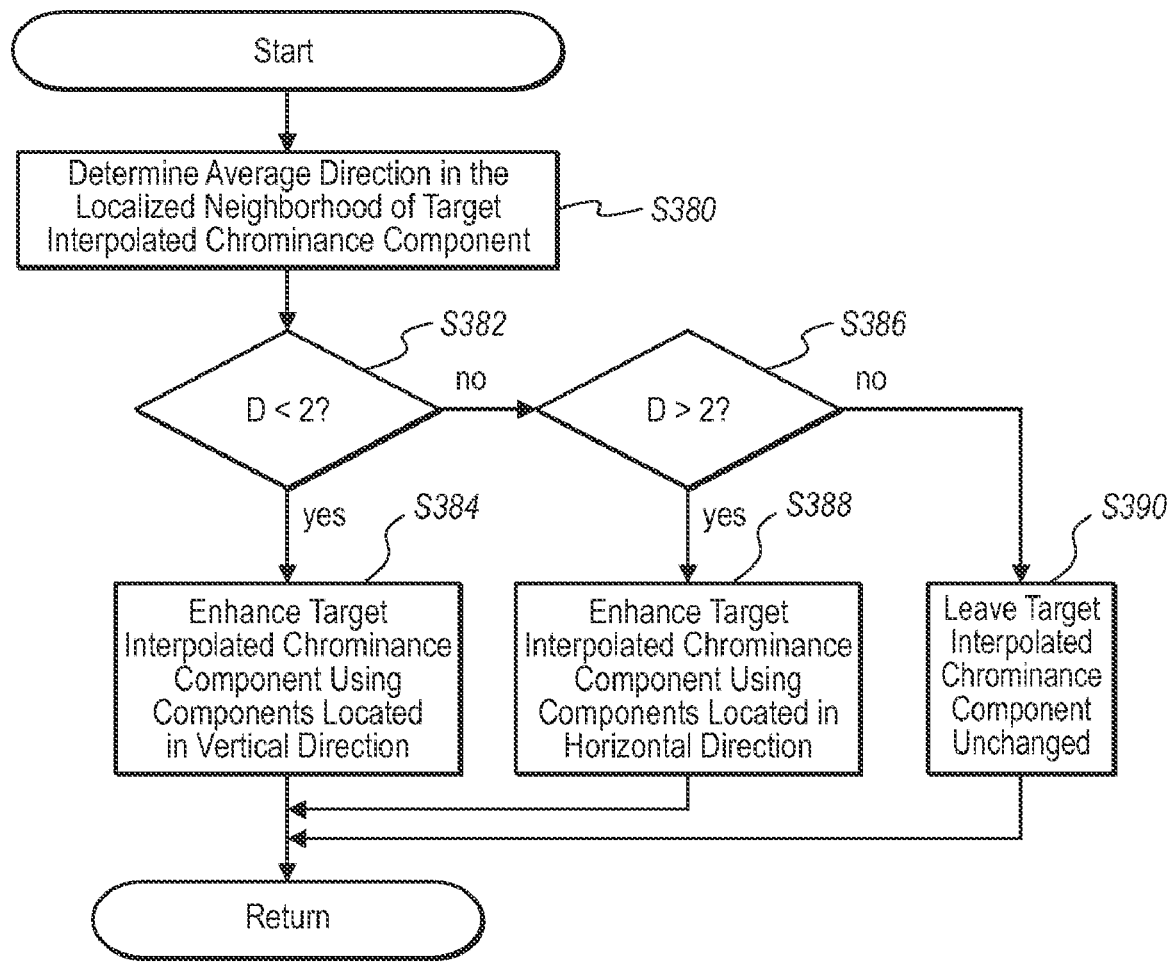
FIG. 15 is a flowchart showing the details of a chrominance component enhancement process executed in the color image data generation process of FIG. 3 by the image processing apparatus.

After the chrominance interpolation process interpolates the remaining color components in each pixel, the proposed solution can use the edge directional map from discussed above to enhance the interpolated chrominance components. FIG. 15 is a flowchart showing the details of the chrominance component enhancement process executed at step S114 in the color image data generation process of FIG. 3 by the image processing apparatus 30.

The chrominance component enhancement process first determines an average direction D in the localized neighborhood of a targeted interpolated chrominance component (step S380). The average direction D may be calculated, for example, using the formula disclosed in FIG. 16A. Alternatively, if an edge direction value $d_{(r,s)}$ in the target pixel location has already been determined in the edge directional map creation process (step S106), the value of D can be set to $d_{(r,s)}$ with no additional calculations needed. Next, the enhancement process determines whether the average direction D is less than 2 (step S382). If so (step S382: yes), the target interpolated chrominance component is enhanced using components located in the vertical direction (step S384). If not (step S382: no), the enhancement process next determines whether the average direction D is greater than 2 (step S386). If so (step S386: yes), the target interpolated chrominance component is enhanced using components located in the horizontal direction (step S388). If not (step S386: no), the average direction D is determined to be equal to 2, and the target interpolated chrominance components is left unchanged (step S390).

FIGS. 16B and 16C show example calculation formulae for enhancing chrominance components. To complete the chrominance component enhancement process of FIG. 15, the example formula disclosed in FIG. 16B may be performed first in all B locations (even r, odd s) and then in all G locations (odd r, odd s) and (even r, even s). Then, the example formula disclosed in FIG. 16C may be performed first in all R locations (odd r, even s) and then in all G locations (odd r, odd s) and (even r, even s).

After enhancement of the chrominance components as described above, the CPU terminates the chrominance component enhancement process of FIG. 15 and goes back to the color image data generation process of FIG. 3. The color image data generation process subsequently outputs image data of interpolated and enhanced R, G, and B components (step S116).

The interpolation and enhancement of the missing color components using any of the above approaches is rather simple and is executable at the high speed. The series of processing disclosed herein thus enables high-speed generation of adequate color image data from raw image data with a mosaic arrangement of the R, G, and B color components.

The digital camera 100 disclosed herein generates the color image data from the raw image data according to the procedure described above. The present invention is not restricted to any of this embodiment and its modifications described above but may be attained in various applications and aspects without departing from the scope or spirit of the main characteristics of the present invention.

The example embodiments disclosed herein may be embodied in other specific forms. The example embodiments disclosed herein are to be considered in all respects only as illustrative and not restrictive.

What is claimed is:

1. An image processing apparatus that receives a mosaic input image and subjects the mosaic input image subject to a series of image processing to generate a full color output image, the image processing apparatus comprising a memory and a processing unit having:
    a luminance-chrominance difference component computation module configured to calculate both vertical and horizontal luminance-chrominance difference components for each pixel of the mosaic input image;
    a luminance-chrominance difference component enhancement module configured to calculate enhanced versions of both vertical and horizontal luminance-chrominance difference components for each pixel of the mosaic input image;
    an edge direction detection module configured to evaluate the variations in the enhanced luminance-chrominance difference components in order to create an edge directional map indicating the direction in which demosaicking should be performed;
    a luminance component interpolation module configured to interpolate a G component for each of the original R and B components using the edge directional map;
    a chrominance component interpolation module configured to interpolate an R component for each of the original G and B components and a B component for each of the original R and G components; and
    a chrominance component enhancement module configured to enhance the interpolated R and B components using the edge directional map; and wherein
    the luminance-chrominance difference component computation module is configured to calculate both vertical and horizontal luminance-chrominance difference components $\Delta^v$ and $\Delta^h$ for each pixel (r,s) of the mosaic input image z according to the following equations:

$$\Delta^v_{(r,s)} = \begin{cases} z_{(r,s)} - (z_{(r-1,s)} + z_{(r+1,s)})/2 & \text{for (odd } r, \text{ odd } s) \text{ and} \\ & \text{(even } r, \text{ even } s) \\ (z_{(r-1,s)} + z_{(r+1,s)})/2 - z_{(r,s)} & \text{otherwise} \end{cases} ; \text{ and}$$

$$\Delta^h_{(r,s)} = \begin{cases} z_{(r,s)} - (z_{(r,s-1)} + z_{(r,s+1)})/2 & \text{for (odd } r, \text{ odd } s) \text{ and} \\ & \text{(even } r, \text{ even } s) \\ (z_{(r,s-1)} + z_{(r,s+1)})/2 - z_{(r,s)} & \text{otherwise} \end{cases} .$$

2. The image processing apparatus as recited in claim 1, wherein:

the luminance-chrominance difference component enhancement module is configured to calculate the enhanced versions $\hat{\Delta}^v$ and $\hat{\Delta}^h$ of the vertical and horizontal luminance-chrominance difference components $\Delta^v$ and $\Delta^h$, respectively, for each pixel (r, s) of the mosaic input image z according to the following equations:

$$\hat{\Delta}^v_{(r,s)} = (\Delta^v_{(r-2,s)} + 2\Delta^v_{(r-1,s)} + 4\Delta^v_{(r,s)} + 2\Delta^v_{(r+1,s)} + \Delta^v_{(r+2,s)})/10; \text{ and}$$

$$\hat{\Delta}^h_{(r,s)} = (\Delta^h_{(r,s-2)} + 2\Delta^h_{(r,s-1)} + 4\Delta^h_{(r,s)} + 2\Delta^h_{(r,s+1)} + \Delta^h_{(r,s+2)})/10.$$

3. The image processing apparatus as recited in claim 2, wherein the edge direction detection module is configured to evaluate the variations in the enhanced luminance-chrominance difference components $\hat{\Delta}^v$ and $\hat{\Delta}^h$ in order to create an edge directional map indicating the direction in which demosaicking should be performed according to the following equation:

$$d_{(r,s)} = \begin{cases} 1 & \text{for } v^v_{(r,s)} < v^h_{(r,s)} \\ 3 & \text{for } v^v_{(r,s)} > v^h_{(r,s)} \\ 2 & \text{otherwise} \end{cases}$$

where:

$$v^v_{(r,s)} = \sum_{i=-1}^{1} \left( \left(\hat{\Delta}^v_{(r-1,s+i)} - \hat{\Delta}^v_{(r,s+i)}\right)^2 + \left(\hat{\Delta}^v_{(r,s+i)} - \hat{\Delta}^v_{(r+1,s+i)}\right)^2 + \left(\hat{\Delta}^v_{(r-1,s+i)} - \hat{\Delta}^v_{(r+1,s+i)}\right)^2 \right);$$

$$v^h_{(r,s)} = \sum_{i=-1}^{1} \left( \left(\hat{\Delta}^h_{(r+i,s-1)} - \hat{\Delta}^h_{(r+i,s)}\right)^2 + \left(\hat{\Delta}^h_{(r+i,s)} - \hat{\Delta}^h_{(r+i,s+1)}\right)^2 + \left(\hat{\Delta}^h_{(r+i,s-1)} - \hat{\Delta}^h_{(r+i,s+1)}\right)^2 \right); \text{ and}$$

the $d_{(r,s)}$ value indicates that demosaicking should be performed in the vertical direction (for $d_{(r,s)}=1$), the horizontal direction (for $d_{(r,s)}=3$), or using samples located in both the vertical and horizontal directions (for $d_{(r,s)}=2$).

4. The image processing apparatus as recited in claim 3, wherein the luminance component interpolation module is configured to interpolate a luminance component for each of the original R and B components using the edge directional map $d_{(r,s)}$ according to the following equation:

$$x_{(r,s)2} = \begin{cases} z_{(r,s)} + \left(\hat{\Delta}^v_{(r-1,s)} + \hat{\Delta}^v_{(r+1,s)}\right)/2 & \text{for } d_{(r,s)} = 1 \\ z_{(r,s)} + \left(\hat{\Delta}^h_{(r,s-1)} + \hat{\Delta}^h_{(r,s+1)}\right)/2 & \text{for } d_{(r,s)} = 3 \\ z_{(r,s)} + \left(\hat{\Delta}^v_{(r-1,s)} + \hat{\Delta}^v_{(r+1,s)} + \hat{\Delta}^h_{(r,s-1)} + \hat{\Delta}^h_{(r,s+1)}\right)/4 & \text{otherwise.} \end{cases}$$

5. The image processing apparatus as recited in claim 4, wherein the chrominance component interpolation module is configured to interpolate an R component for each of the original G and B components and a B component for each of the original R and G components according to the following equations:

$$x_{(r,s)1} = x_{(r,s)2} + ((x_{(r-1,s-1)1} - x_{(r-1,s-1)2}) + (x_{(r-1,s+1)1} - x_{(r-1,s+1)2}) +$$
$$(x_{(r+1,s-1)1} - x_{(r+1,s-1)2}) + (x_{(r+1,s+1)1} - x_{(r+1,s+1)2}))/4,$$

for(even $r$, odd $s$);

$$x_{(r,s)3} = x_{(r,s)2} + ((x_{(r-1,s-1)3} - x_{(r-1,s-1)2}) + (x_{(r-1,s+1)3} - x_{(r-1,s+1)2}) +$$
$$(x_{(r+1,s-1)3} - x_{(r+1,s-1)2}) + (x_{(r+1,s+1)3} - x_{(r+1,s+1)2}))/4,$$

for(odd $r$, even $s$);

$$x_{(r,s)1} =$$
$$x_{(r,s)2} + ((x_{(r-1,s)1} - x_{(r-1,s)2}) + (x_{(r,s+1)1} - x_{(r,s-1)2}) + (x_{(r,s+1)1} - x_{(r,s+1)2}) +$$
$$(x_{(r+1,s)1} - x_{(r+1,s)2}))/4,$$

for(odd $r$, odd $s$) and (even $r$, even $s$); and $$x_{(r,s)3} =$$
$$x_{(r,s)2} + ((x_{(r-1,s)3} - x_{(r-1,s)2}) + (x_{(r,s-1)3} - x_{(r,s-1)2}) + (x_{(r,s+1)3} - x_{(r,s+1)2}) +$$
$$(x_{(r+1,s)3} - x_{(r+1,s)2}))/4,$$

for(odd $r$, odd $s$) and (even $r$, even $s$).

6. The image processing apparatus as recited in claim 5, wherein the directional chrominance component interpolation module is configured to use the edge directional map $d_{(r,s)}$ to direct the interpolated chrominance component enhancement process along the edges within the image z according to the following equations:

$$x_{(r,s)1} = \begin{cases} x_{(r,s)2} + (x_{(r-1,s)1} - x_{(r-1,s)2} + x_{(r+1,s)1} - x_{(r+1,s)2})/2 & \text{if } D < 2 \\ x_{(r,s)2} + (x_{(r,s-1)1} - x_{(r,s-1)2} + x_{(r,s+1)1} - x_{(r,s+1)2})/2 & \text{if } D > 2 \\ x_{(r,s)1} & \text{otherwise} \end{cases}$$

$$x_{(r,s)3} = \begin{cases} x_{(r,s)2} + (x_{(r-1,s)3} - x_{(r-1,s)2} + x_{(r+1,s)3} - x_{(r+1,s)2})/2 & \text{if } D < 2 \\ x_{(r,s)2} + (x_{(r,s-1)3} - x_{(r,s-1)2} + x_{(r,s+1)3} - x_{(r,s+1)2})/2 & \text{if } D > 2 \\ x_{(r,s)3} & \text{otherwise} \end{cases}$$

where $$D = (d_{(r-1,s)} + d_{(r,s-1)} + d_{(r,s+1)} + d_{(r+1,s)})/4$$

or $$D = d_{(r,s)}.$$

7. The image processing apparatus as recited in claim 2, wherein the edge direction detection module is configured to evaluate the variations in the enhanced luminance-chrominance difference components $\hat{\Delta}^v$ and $\hat{\Delta}^h$ in order to create an edge directional map indicating the direction in which demosaicking should be performed according to the following equation:

$$d_{(r,s)} = \begin{cases} 1 & \text{for } v^v_{(r,s)} < v^h_{(r,s)} \text{ and } v^v_{(r,s)} > \Phi \\ 3 & \text{for } v^v_{(r,s)} > v^h_{(r,s)} \text{ and } v^h_{(r,s)} > \Phi \\ 2 & \text{otherwise} \end{cases}$$

where:

$\Phi$ is a predetermined variation constraint;

$$v^v_{(r,s)} = \sum_{i=-1}^{1} \left( \left(\hat{\Delta}^v_{(r-1,s+i)} - \hat{\Delta}^v_{(r,s+i)}\right)^2 + \right.$$
$$\left. \left(\hat{\Delta}^v_{(r,s+i)} - \hat{\Delta}^v_{(r+1,s+i)}\right)^2 + \left(\hat{\Delta}^v_{(r-1,s+i)} - \hat{\Delta}^v_{(r+1,s+i)}\right)^2 \right);$$

$$v^h_{(r,s)} = \sum_{i=-1}^{1} \left( \left(\hat{\Delta}^h_{(r+i,s-1)} - \hat{\Delta}^h_{(r+i,s)}\right)^2 + \left(\hat{\Delta}^h_{(r+i,s)} - \hat{\Delta}^h_{(r+i,s+1)}\right)^2 + \right.$$
$$\left. \left(\hat{\Delta}^h_{(r+i,s-1)} - \hat{\Delta}^h_{(r+i,s+1)}\right)^2 \right); \text{ and}$$

the $d_{(r,s)}$ value indicates that demosaicking should be performed in the vertical direction (for $d_{(r,s)}=1$), the horizontal direction (for $d_{(r,s)}=3$), or using samples located in both the vertical and horizontal directions (for $d_{(r,s)}=2$).

8. The image processing apparatus as recited in claim 7, wherein the luminance component interpolation module is configured to interpolate a luminance component for each of the original R and B components using the edge directional map $d_{(r,s)}$ according to the following equation:

$$x_{(r,s)2} = \begin{cases} z_{(r,s)} + \left(\hat{\Delta}^v_{(r-1,s)} + \hat{\Delta}^v_{(r+1,s)}\right)/2 & \text{for } d_{(r,s)} = 1 \\ z_{(r,s)} + \left(\hat{\Delta}^h_{(r,s-1)} + \hat{\Delta}^h_{(r,s+1)}\right)/2 & \text{for } d_{(r,s)} = 3 \\ z_{(r,s)} + \dfrac{v^h_{(r,s)}\left(\hat{\Delta}^v_{(r-1,s)} + \hat{\Delta}^v_{(r+1,s)}\right)/2 +}{v^h_{(r,s)} + v^v_{(r,s)}} \\ z_{(r,s)} + \dfrac{v^v_{(r,s)}\left(\hat{\Delta}^h_{(r,s-1)} + \hat{\Delta}^h_{(r,s+1)}\right)/2}{v^h_{(r,s)} + v^v_{(r,s)}} & \text{otherwise.} \end{cases}$$

9. The image processing apparatus as recited in claim 1, further comprising a clamping module configured to detect a signal overshoot or undershoot in each interpolated G component and to clamp each interpolated G component with a detected signal overshoot or undershoot to the closest neighboring original G component in the direction in which demosaicking is being performed.

10. A method for demosaicking a mosaic input image to generate a full color output image, the method comprising the steps of using a processing unit to:
  a) calculate both vertical and horizontal luminance-chrominance difference components for each pixel of the mosaic input image;
  b) calculate an enhanced version of both the vertical and horizontal luminance-chrominance difference components for each pixel of the mosaic input image;
  c) evaluate the variations in the enhanced luminance-chrominance difference components in order to create an edge directional map indicating the direction in which demosaicking should be performed;
  d) interpolate a G component for each of the original R and B components using the edge directional map;
  e) interpolate an R component for each of the original G and B components and a B component for each of the original R and G components; and
  f) enhance the interpolated R and B components using the edge directional map; and wherein the step a) comprises calculating both vertical and horizontal luminance-chrominance difference components $\Delta^v$ and $\Delta^h$ for each pixel (r,s) of the mosaic input image z according to the following equations:

$$\Delta^v_{(r,s)} = \begin{cases} z_{(r,s)} - (z_{(r-1,s)} + z_{(r+1,s)})/2 & \text{for(odd } r, \text{ odd } s) \text{ and} \\ & \text{(even } r, \text{ even } s) \\ (z_{(r-1,s)} + z_{(r+1,s)})/2 - z_{(r,s)} & \text{otherwise} \end{cases} ; \text{ and}$$

$$\Delta^h_{(r,s)} = \begin{cases} z_{(r,s)} - (z_{(r,s-1)} + z_{(r,s+1)})/2 & \text{for(odd } r, \text{ odd } s) \text{ and} \\ & \text{(even } r, \text{ even } s) \\ (z_{(r,s-1)} + z_{(r,s+1)})/2 - z_{(r,s)} & \text{otherwise.} \end{cases}$$

11. The method as recited in claim 10, wherein the step b) comprises calculating an enhanced version $\hat{\Delta}^v$ and $\hat{\Delta}^h$ of both the vertical luminance-chrominance difference components $\Delta^v$ and $\Delta^h$ for each pixel (r, s) of the mosaic input image z according to the following equations:

$$\hat{\Delta}^v_{(r,s)} = (\Delta^v_{(r-2,s)} + 2\Delta^v_{(r-1,s)} + 4\Delta^v_{(r,s)} + 2\Delta^v_{(r+1,s)} + \Delta^v_{(r+2,s)})/10; \text{ and}$$

$$\hat{\Delta}^h_{(r,s)} = (\Delta^h_{(r,s-2)} + 2\Delta^h_{(r,s-1)} + 4\Delta^h_{(r,s)} + 2\Delta^h_{(r,s+1)} + \Delta^h_{(r,s+2)})/10.$$

12. The method as recited in claim 11, wherein the step c) comprises evaluating the variations in the enhanced luminance-chrominance difference components $\hat{\Delta}^v$ and $\hat{\Delta}^h$ in order to create an edge directional map indicating the direction in which demosaicking should be performed according to the following equations:

$$d_{(r,s)} = \begin{cases} 1 & \text{for } v^v_{(r,s)} < v^h_{(r,s)} \\ 3 & \text{for } v^v_{(r,s)} > v^h_{(r,s)} \\ 2 & \text{otherwise} \end{cases}$$

where:

$$v^v_{(r,s)} = \sum_{i=-1}^{1} \begin{pmatrix} \left(\hat{\Delta}^v_{(r-1,s+i)} - \hat{\Delta}^v_{(r,s+i)}\right)^2 + \\ \left(\hat{\Delta}^v_{(r,s+i)} - \hat{\Delta}^v_{(r+1,s+i)}\right)^2 + \\ \left(\hat{\Delta}^v_{(r-1,s+i)} - \hat{\Delta}^v_{(r+1,s+i)}\right)^2 \end{pmatrix};$$

$$v^h_{(r,s)} = \sum_{i=-1}^{1} \begin{pmatrix} \left(\hat{\Delta}^h_{(r+i,s-1)} - \hat{\Delta}^h_{(r+i,s)}\right)^2 + \\ \left(\hat{\Delta}^h_{(r+i,s)} - \hat{\Delta}^h_{(r+i,s+1)}\right)^2 + \\ \left(\hat{\Delta}^h_{(r+i,s-1)} - \hat{\Delta}^h_{(r+i,s+1)}\right)^2 \end{pmatrix}; \text{ and}$$

the $d_{(r,s)}$ value indicates that demosaicking should be performed in the vertical direction (for $d_{(r,s)}=1$), the horizontal direction (for $d_{(r,s)}=3$), or using samples located in both the vertical and horizontal directions (for $d_{(r,s)}=2$).

13. The method as recited in claim 12, wherein the step d) comprises interpolating a G component for each of the original R and B components using the edge directional map according to the following equation:

$$x_{(r,s)2} = \begin{cases} z_{(r,s)} + (\hat{\Delta}^v_{(r-1,s)} + \hat{\Delta}^v_{(r+1,s)})/2 & \text{for } d_{(r,s)} = 1 \\ z_{(r,s)} + (\hat{\Delta}^h_{(r,s-1)} + \hat{\Delta}^h_{(r,s+1)})/2 & \text{for } d_{(r,s)} = 3 \\ z_{(r,s)} + \begin{pmatrix} \hat{\Delta}^v_{(r-1,s)} + \hat{\Delta}^v_{(r+1,s)} + \\ \hat{\Delta}^h_{(r,s-1)} + \hat{\Delta}^h_{(r,s+1)} \end{pmatrix}/4 & \text{otherwise.} \end{cases}$$

14. The method as recited in claim 13, wherein the step e) comprises interpolating an R component for each of the original G and B components and a B component for each of the original R and G components according to the following equations:

$$x_{(r,s)1} = x_{(r,s)2} + \left( \frac{(x_{(r-1,s-1)1} - x_{(r-1,s-1)2}) + (x_{(r-1,s+1)1} - x_{(r-1,s+1)2}) +}{(x_{(r+1,s-1)1} - x_{(r+1,s-1)2}) + (x_{(r+1,s+1)1} - x_{(r+1,s+1)2})} \right)/4,$$

for(even $r$, odd $s$);

$$x_{(r,s)3} = x_{(r,s)2} + \left( \frac{(x_{(r-1,s-1)3} - x_{(r-1,s-1)2}) + (x_{(r-1,s+1)3} - x_{(r-1,s+1)2}) +}{(x_{(r+1,s-1)3} - x_{(r+1,s-1)2}) + (x_{(r+1,s+1)3} - x_{(r+1,s+1)2})} \right)/4,$$

for(odd $r$, even $s$);

$$x_{(r,s)1} = x_{(r,s)2} + \left( \frac{(x_{(r-1,s)1} - x_{(r-1,s)2}) + (x_{(r,s-1)1} - x_{(r,s-1)2}) +}{(x_{(r,s+1)1} - x_{(r,s+1)2}) + (x_{(r+1,s)1} - x_{(r+1,s)2})} \right)/4,$$

for(odd $r$, odd $s$) and (even $r$, even $s$); and $$x_{(r,s)3} = x_{(r,s)2} + \left( \frac{(x_{(r-1,s)3} - x_{(r-1,s)2}) + (x_{(r,s-1)3} - x_{(r,s-1)2}) +}{(x_{(r,s+1)3} - x_{(r,s+1)2}) + (x_{(r+1,s)3} - x_{(r+1,s)2})} \right)/4,$$

for(odd $r$, odd $s$) and (even $r$, even $s$).

15. The method as recited in claim 14, wherein the step f) comprises enhancing the interpolated R and B components using the edge directional map according to the following equations:

$$x_{(r,s)1} = \begin{cases} x_{(r,s)2} + \begin{pmatrix} x_{(r-1,s)1} - x_{(r-1,s)2} + \\ x_{(r+1,s)1} - x_{(r+1,s)2} \end{pmatrix}/2 & \text{if } D < 2 \\ x_{(r,s)2} + \begin{pmatrix} x_{(r,s-1)1} - x_{(r,s-1)2} + \\ x_{(r,s+1)1} - x_{(r,s+1)2} \end{pmatrix}/2 & \text{if } D > 2 \\ x_{(r,s)1} & \text{otherwise} \end{cases}$$

$$x_{(r,s)3} = \begin{cases} x_{(r,s)2} + \begin{pmatrix} x_{(r-1,s)3} - x_{(r-1,s)2} + \\ x_{(r+1,s)3} - x_{(r+1,s)2} \end{pmatrix}/2 & \text{if } D < 2 \\ x_{(r,s)2} + \begin{pmatrix} x_{(r,s-1)3} - x_{(r,s-1)2} + \\ x_{(r,s+1)3} - x_{(r,s+1)2} \end{pmatrix}/2 & \text{if } D > 2 \\ x_{(r,s)3} & \text{otherwise} \end{cases}$$

where $D = (d_{(r-1,s)} + d_{(r,s-1)} + d_{(r,s+1)} + d_{(r+1,s)})/4$ or $D = d_{(r,s)}$.

16. The method as recited in claim 11, wherein the step c) comprises evaluating the variations in the enhanced luminance-chrominance difference components $\hat{\Delta}^v$ and $\hat{\Delta}^h$ in order to create an edge directional map indicating the direction in which demosaicking should be performed according to the following equations:

$$d_{(r,s)} = \begin{cases} 1 & \text{for } v^v_{(r,s)} < v^h_{(r,s)} \text{ and } v^v_{(r,s)} > \Phi \\ 3 & \text{for } v^v_{(r,s)} > v^h_{(r,s)} \text{ and } v^h_{(r,s)} > \Phi \\ 2 & \text{otherwise} \end{cases}$$

where:

$\Phi$ is a predetermined variation constraint;

$$v^v_{(r,s)} = \sum_{i=-1}^{1} \begin{pmatrix} (\hat{\Delta}^v_{(r-1,s+i)} - \hat{\Delta}^v_{(r,s+i)})^2 + \\ (\hat{\Delta}^v_{(r,s+i)} - \hat{\Delta}^v_{(r+1,s+i)})^2 + \\ (\hat{\Delta}^v_{(r-1,s+i)} - \hat{\Delta}^v_{(r+1,s+i)})^2 \end{pmatrix};$$

$$v^h_{(r,s)} = \sum_{i=-1}^{1} \begin{pmatrix} (\hat{\Delta}^h_{(r+i,s-1)} - \hat{\Delta}^h_{(r+i,s)})^2 + \\ (\hat{\Delta}^h_{(r+i,s)} - \hat{\Delta}^h_{(r+i,s+1)})^2 + \\ (\hat{\Delta}^h_{(r+i,s-1)} - \hat{\Delta}^h_{(r+i,s+1)})^2 \end{pmatrix}; \text{ and}$$

the $d_{(r,s)}$ value indicates that demosaicking should be performed in the vertical direction (for $d_{(r,s)}=1$), the horizontal direction (for $d_{(r,s)}=3$), or using samples located in both the vertical and horizontal directions (for $d_{(r,s)}=2$).

17. The method as recited in claim 16, wherein the step d) comprises interpolating a G component for each of the original R and B components using the edge directional map according to the following equation:

$$x_{(r,s)2} = \begin{cases} z_{(r,s)} + (\hat{\Delta}^v_{(r-1,s)} + \hat{\Delta}^v_{(r+1,s)})/2 & \text{for } d_{(r,s)} = 1 \\ z_{(r,s)} + (\hat{\Delta}^h_{(r,s-1)} + \hat{\Delta}^h_{(r,s+1)})/2 & \text{for } d_{(r,s)} = 3 \\ z_{(r,s)} + \dfrac{v^h_{(r,s)}(\hat{\Delta}^v_{(r-1,s)} + \hat{\Delta}^v_{(r+1,s)})/2}{v^h_{(r,s)} + v^v_{(r,s)}} & \text{otherwise.} \\ \quad + \dfrac{v^v_{(r,s)}(\hat{\Delta}^h_{(r,s-1)} + \hat{\Delta}^h_{(r,s+1)})/2}{} \end{cases}$$

18. The method as recited in claim 10, further comprising the following steps after step d) and before step e):
    d1) detecting a signal overshoot or undershoot in each interpolated G component; and
    d2) clamping each interpolated G component with a detected signal overshoot or undershoot to the closest neighboring original G component in the direction in which demosaicking is being performed.

19. One or more non-transitory computer-readable media having computer-readable instructions thereon which, when executed, implement a method for demosaicking a mosaic input image subject to generate a full color output image, the method comprising the steps of:
    a) calculating both vertical and horizontal luminance-chrominance difference components for each pixel of the mosaic input image;
    b) calculating an enhanced version of both the vertical and horizontal luminance-chrominance difference components for each pixel of the mosaic input image;
    c) evaluating the variations in the enhanced luminance-chrominance difference components in order to create an edge directional map indicating the direction in which demosaicking should be performed;
    d) interpolating a G component for each of the original R and B components using the edge directional map;

e) interpolating an R component for each of the original G and B components and a B component for each of the original R and G components; and f) enhancing the interpolated R and B components by directing a chrominance demosaicking process along the edges within the image using the edge directional map; and wherein the step a) comprises calculating both vertical and horizontal luminance-chrominance difference components $\Delta^v$ and $\Delta^h$ for each pixel (r,s) of the mosaic input image z according to the following equations:

$$\Delta^v_{(r,s)} = \begin{cases} z_{(r,s)} - (z_{(r-1,s)} + z_{(r+1,s)})/2 & \text{for(odd } r\text{, odd } s\text{) and (even } r\text{, even } s\text{)} \\ (z_{(r-1,s)} + z_{(r+1,s)})/2 - z_{(r,s)} & \text{otherwise} \end{cases} ; \text{and}$$

$$\Delta^h_{(r,s)} = \begin{cases} z_{(r,s)} - (z_{(r,s-1)} + z_{(r,s+1)})/2 & \text{for(odd } r\text{, odd } s\text{) and (even } r\text{, even } s\text{)} \\ (z_{(r,s-1)} + z_{(r,s+1)})/2 - z_{(r,s)} & \text{otherwise.} \end{cases}$$

20. The one or more non-transitory computer-readable media as recited in claim 19, wherein:

the step b) comprises calculating an enhanced version $\hat{\Delta}^v$ and $\hat{\Delta}^h$ of both the vertical luminance-chrominance difference components $\Delta^v$ and $\Delta^h$ for each pixel (r,s) of the mosaic input image z according to the following equations:

$$\hat{\Delta}^v_{(r,s)} = (\Delta^v_{(r-2,s)} + 2\Delta^v_{(r-1,s)} + 4\Delta^v_{(r,s)} + 2\Delta^v_{(r+1,s)} + \Delta^v_{(r+2,s)})/10; \text{ and}$$

$$\hat{\Delta}^h_{(r,s)} = (\Delta^h_{(r,s-2)} + 2\Delta^h_{(r,s-1)} + 4\Delta^h_{(r,s)} + 2\Delta^h_{(r,s+1)} + \Delta^h_{(r,s+2)})/10.$$

21. The one or more non-transitory computer-readable media as recited in claim 20, wherein the step c) comprises evaluating the variations in the enhanced luminance-chrominance difference components $\hat{\Delta}^v$ and $\hat{\Delta}^h$ in order to create an edge directional map indicating the direction in which demosaicking should be performed according to the following equations:

$$d_{(r,s)} = \begin{cases} 1 & \text{for } v^v_{(r,s)} < v^h_{(r,s)} \\ 3 & \text{for } v^v_{(r,s)} > v^h_{(r,s)} \\ 2 & \text{otherwise} \end{cases}$$

where:

$$v^v_{(r,s)} = \sum_{i=-1}^{v} \begin{pmatrix} (\hat{\Delta}^v_{(r-1,s+i)} - \hat{\Delta}^v_{(r,s+i)})^2 + \\ (\hat{\Delta}^v_{(r,s+i)} - \hat{\Delta}^v_{(r+1,s+i)})^2 + \\ (\hat{\Delta}^v_{(r-1,s+i)} - \hat{\Delta}^v_{(r+1,s+i)})^2 \end{pmatrix};$$

$$v^h_{(r,s)} = \sum_{i=-1}^{1} \begin{pmatrix} (\hat{\Delta}^h_{(r+i,s-1)} - \hat{\Delta}^h_{(r+i,s)})^2 + \\ (\hat{\Delta}^h_{(r+i,s)} - \hat{\Delta}^h_{(r+i,s+1)})^2 + \\ (\hat{\Delta}^h_{(r+i,s-1)} - \hat{\Delta}^h_{(r+i,s+1)})^2 \end{pmatrix}; \text{and}$$

the $d_{(r,s)}$ value indicates that demosaicking should be performed in the vertical direction (for $d_{(r,s)}=1$), the horizontal direction (for $d_{(r,s)}=3$), or using samples located in both the vertical and horizontal directions (for $d_{(r,s)}=2$).

22. The one or more non-transitory computer-readable media as recited in claim 21, wherein:

the step d) comprises interpolating a G component for each of the original R and B components using the edge directional map according to the following equation:

$$x_{(r,s)2} = \begin{cases} z_{(r,s)} + (\hat{\Delta}^v_{(r-1,s)} + \hat{\Delta}^v_{(r+1,s)})/2 & \text{for } d_{(r,s)} = 1 \\ z_{(r,s)} + (\hat{\Delta}^h_{(r,s-1)} + \hat{\Delta}^h_{(r,s+1)})/2 & \text{for } d_{(r,s)} = 3 \\ z_{(r,s)} + \begin{pmatrix} \hat{\Delta}^v_{(r-1,s)} + \hat{\Delta}^v_{(r+1,s)} + \\ \hat{\Delta}^h_{(r,s-1)} + \hat{\Delta}^h_{(r,s+1)} \end{pmatrix}/4 & \text{otherwise.} \end{cases} ; \text{and}$$

the step e) comprises interpolating an R component for each of the original G and B components and a B component for each of the original R and G components according to the following equations:

$$x_{(r,s)1} = x_{(r,s)2} + \left( \begin{matrix} (x_{(r-1,s-1)1} - x_{(r-1,s-1)2}) + (x_{(r-1,s+1)1} - x_{(r-1,s+1)2}) + \\ (x_{(r+1,s-1)1} - x_{(r+1,s-1)2}) + (x_{(r+1,s+1)1} - x_{(r+1,s+1)2}) \end{matrix} \right)/4,$$

for(even r, odd s);

$$x_{(r,s)3} = x_{(r,s)2} + \left( \begin{matrix} (x_{(r-1,s-1)3} - x_{(r-1,s-1)2}) + (x_{(r-1,s+1)3} - x_{(r-1,s+1)2}) + \\ (x_{(r+1,s-1)3} - x_{(r+1,s-1)2}) + (x_{(r+1,s+1)3} - x_{(r+1,s+1)2}) \end{matrix} \right)/4,$$

for(odd r, even s);

$$x_{(r,s)1} = x_{(r,s)2} + \left( \begin{matrix} (x_{(r-1,s)1} - x_{(r-1,s)2}) + (x_{(r,s-1)1} - x_{(r,s-1)2}) + \\ (x_{(r,s+1)1} - x_{(r,s+1)2}) + (x_{(r+1,s)1} - x_{(r+1,s)2}) \end{matrix} \right)/4,$$

for(odd r, odd s) and (even r, even s); and $$x_{(r,s)3} = x_{(r,s)2} + \left( \begin{matrix} (x_{(r-1,s)3} - x_{(r-1,s)2}) + (x_{(r,s-1)3} - x_{(r,s-1)2}) + \\ (x_{(r,s+1)3} - x_{(r,s+1)2}) + (x_{(r+1,s)3} - x_{(r+1,s)2}) \end{matrix} \right)/4,$$

for(odd r, odd s) and (even r, even s).

23. The one or more non-transitory computer-readable media as recited in claim 22, wherein the step f) comprises enhancing the interpolated R and B components using the edge directional map according to the following equations:

$$x_{(r,s)1} = \begin{cases} x_{(r,s)2} + \left( \begin{matrix} x_{(r-1,s)1} - x_{(r-1,s)2} + \\ x_{(r+1,s)2} - x_{(r+1,s)2} \end{matrix} \right)/2 & \text{if } D < 2 \\ x_{(r,s)2} + \left( \begin{matrix} x_{(r,s-1)1} - x_{(r,s-1)2} + \\ x_{(r,s+1)1} - x_{(r,s+1)2} \end{matrix} \right)/2 & \text{if } D > 2 \\ x_{(r,s)1} & \text{otherwise} \end{cases}$$

$$x_{(r,s)3} = \begin{cases} x_{(r,s)2} + \left( \begin{matrix} x_{(r-1,s)3} - x_{(r-1,s)2} + \\ x_{(r+1,s)3} - x_{(r+1,s)2} \end{matrix} \right)/2 & \text{if } D < 2 \\ x_{(r,s)2} + \left( \begin{matrix} x_{(r,s-1)3} - x_{(r,s-1)2} + \\ x_{(r,s+1)3} - x_{(r,s+1)2} \end{matrix} \right)/2 & \text{if } D > 2 \\ x_{(r,s)3} & \text{otherwise} \end{cases}$$

where $D = (d_{(r-1,s)} + d_{(r,s-1)} + d_{(r,s+1)} + d_{(r+1,s)})/4$ or $D = d_{(r,s)}$.

24. The one or more non-transitory computer-readable media as recited in claim 20, wherein the step c) comprises evaluating the variations in the enhanced luminance-chrominance difference components $\hat{\Delta}^v$ and $\hat{\Delta}^h$ in order to create an edge directional map indicating the direction in which demosaicking should be performed according to the following equations:

$$d_{(r,s)} = \begin{cases} 1 & \text{for } v^v_{(r,s)} < v^h_{(r,s)} \text{ and } v^v_{(r,s)} > \Phi \\ 3 & \text{for } v^v_{(r,s)} > v^h_{(r,s)} \text{ and } v^h_{(r,s)} > \Phi \\ 2 & \text{otherwise} \end{cases}$$

where:

$\Phi$ is a predetermined variation constraint;

$$v^v_{(r,s)} = \sum_{i=-1}^{1} \begin{pmatrix} \left(\hat{\Delta}^v_{(r-1,s+i)} - \hat{\Delta}^v_{(r,s+i)}\right)^2 + \\ \left(\hat{\Delta}^v_{(r,s+i)} - \hat{\Delta}^v_{(r+1,s+i)}\right)^2 + \\ \left(\hat{\Delta}^v_{(r-1,s+i)} - \hat{\Delta}^v_{(r+1,s+i)}\right)^2 \end{pmatrix};$$

$$v^h_{(r,s)} = \sum_{i=-1}^{1} \begin{pmatrix} \left(\hat{\Delta}^h_{(r+i,s-1)} - \hat{\Delta}^h_{(r+i,s)}\right)^2 + \\ \left(\hat{\Delta}^h_{(r+i,s)} - \hat{\Delta}^h_{(r+i,s+1)}\right)^2 + \\ \left(\hat{\Delta}^h_{(r+i,s-1)} - \hat{\Delta}^h_{(r+i,s+1)}\right)^2 \end{pmatrix}; \text{ and}$$

the $d_{(r,s)}$ value indicates that demosaicking should be performed in the vertical direction (for $d_{(r,s)}=1$), the horizontal direction (for $d_{(r,s)}=3$), or using samples located in both the vertical and horizontal directions (for $d_{(r,s)}=2$).

25. The one or more non-transitory computer-readable media as recited in claim 24, wherein:
the step d) comprises interpolating a G component for each of the original R and B components using the edge directional map according to the following equation:

$$x_{(r,s)2} = \begin{cases} z_{(r,s)} + \left(\hat{\Delta}^v_{(r-1,s)} + \hat{\Delta}^v_{(r+1,s)}\right)/2 & \text{for } d_{(r,s)} = 1 \\ z_{(r,s)} + \left(\hat{\Delta}^h_{(r,s-1)} + \hat{\Delta}^h_{(r,s+1)}\right)/2 & \text{for } d_{(r,s)} = 1 \\ v^h_{(r,s)}\left(\hat{\Delta}^v_{(r-1,s)} + \hat{\Delta}^v_{(r+1,s)}\right)/2 \\ z_{(r,s)} + \dfrac{v^v_{(r,s)}\left(\hat{\Delta}^h_{(r,s-1)} + \hat{\Delta}^h_{(r,s+1)}\right)/2}{v^h_{(r,s)} + v^v_{(r,s)}} & \text{otherwise.} \end{cases}$$

26. The one or more non-transitory computer-readable media as recited in claim 19, further comprising the following steps after step d) and before step e):
   d1) detecting a signal overshoot or undershoot in each interpolated G component; and
   d2) clamping each interpolated G component with a detected signal overshoot or undershoot to the closest neighboring original G component in the direction in which demosaicking is being performed.

* * * * *

UNITED STATES PATENT AND TRADEMARK OFFICE
CERTIFICATE OF CORRECTION

| | | |
|---|---|---|
| PATENT NO. | : 8,111,299 B2 | Page 1 of 1 |
| APPLICATION NO. | : 12/192714 | |
| DATED | : February 7, 2012 | |
| INVENTOR(S) | : Rastislav Lukac | |

It is certified that error appears in the above-identified patent and that said Letters Patent is hereby corrected as shown below:

Column 26.
Line 46, please change

"$$x_{(r,s)1} = \begin{cases} x_{(r,s)2} + (x_{(r-1,s)1} - x_{(r-1,s)2} + x_{(r+1,s)2} - x_{(r+1,s)2})/2 & \text{if } D < 2 \\ x_{(r,s)2} + (x_{(r,s-1)1} - x_{(r,s-1)2} + x_{(r,s+1)1} - x_{(r,s+1)2})/2 & \text{if } D > 2 \\ x_{(r,s)1} & \text{otherwise} \end{cases}$$"

to --

$$x_{(r,s)1} = \begin{cases} x_{(r,s)2} + (x_{(r-1,s)1} - x_{(r-1,s)2} + x_{(r+1,s)1} - x_{(r+1,s)2})/2 & \text{if } D < 2 \\ x_{(r,s)2} + (x_{(r,s-1)1} - x_{(r,s-1)2} + x_{(r,s+1)1} - x_{(r,s+1)2})/2 & \text{if } D > 2 \\ x_{(r,s)1} & \text{otherwise} \end{cases}$$

--

Column 28,
Line 12, please change

"$$x_{(r,s)2} = \begin{cases} z_{(r,s)} + (\hat{\Delta}^v_{(r-1,s)} + \hat{\Delta}^v_{(r+1,s)})/2 & \text{for } d_{(r,s)} = 1 \\ z_{(r,s)} + (\hat{\Delta}^h_{(r,s-1)} + \hat{\Delta}^h_{(r,s+1)})/2 & \text{for } d_{(r,s)} = 1; \\ z_{(r,s)} + \dfrac{v^h_{(r,s)}(\hat{\Delta}^v_{(r-1,s)} + \hat{\Delta}^v_{(r+1,s)})/2 + v^v_{(r,s)}(\hat{\Delta}^h_{(r,s-1)} + \hat{\Delta}^h_{(r,s+1)})/2}{v^h_{(r,s)} + v^v_{(r,s)}} & \text{otherwise.} \end{cases}$$"

to --

$$x_{(r,s)2} = \begin{cases} z_{(r,s)} + (\hat{\Delta}^v_{(r-1,s)} + \hat{\Delta}^v_{(r+1,s)})/2 & \text{for } d_{(r,s)} = 1 \\ z_{(r,s)} + (\hat{\Delta}^h_{(r,s-1)} + \hat{\Delta}^h_{(r,s+1)})/2 & \text{for } d_{(r,s)} = 3; \\ z_{(r,s)} + \dfrac{v^h_{(r,s)}(\hat{\Delta}^v_{(r-1,s)} + \hat{\Delta}^v_{(r+1,s)})/2 + v^v_{(r,s)}(\hat{\Delta}^h_{(r,s-1)} + \hat{\Delta}^h_{(r,s+1)})/2}{v^h_{(r,s)} + v^v_{(r,s)}} & \text{otherwise.} \end{cases}$$

--

Signed and Sealed this

Seventeenth Day of April, 2012

David J. Kappos
*Director of the United States Patent and Trademark Office*